United States Patent
Wang et al.

(10) Patent No.: US 10,504,400 B2
(45) Date of Patent: Dec. 10, 2019

(54) METHOD AND APPARATUS FOR PERFORMING CORRECTION PROCESSING ON GRAYSCALE OF A PIXEL IN AN IMAGE

(71) Applicant: SHANGHAI TIANMA AM-OLED CO., LTD., Shanghai (CN)

(72) Inventors: Guang Wang, Shanghai (CN); Jingxiong Zhou, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 39 days.

(21) Appl. No.: 15/890,362

(22) Filed: Feb. 7, 2018

(65) Prior Publication Data

US 2018/0166003 A1    Jun. 14, 2018

(30) Foreign Application Priority Data

Sep. 29, 2017   (CN) .......................... 2017 1 0911245

(51) Int. Cl.
*G06K 9/00* (2006.01)
*G09G 3/20* (2006.01)

(52) U.S. Cl.
CPC ... *G09G 3/2003* (2013.01); *G09G 2320/0285* (2013.01); *G09G 2320/0626* (2013.01); *G09G 2340/14* (2013.01)

(58) Field of Classification Search
CPC ............. G09G 3/2003; G09G 2340/14; G09G 2320/0626; G09G 2320/0285; G06T 5/003
See application file for complete search history.

(56) References Cited

U.S. PATENT DOCUMENTS

| 7,643,041 B2 * | 1/2010 | Tomohara ............ G09G 3/2014 345/690 |
| 7,724,951 B2 * | 5/2010 | Takayama ................ G06K 9/40 382/170 |
| 7,755,657 B2 * | 7/2010 | Sandstrom .......... G03F 7/70291 250/492.2 |

(Continued)

FOREIGN PATENT DOCUMENTS

| CN | 101097674 A | 1/2008 |
| CN | 101867682 A | 10/2010 |

(Continued)

*Primary Examiner* — Amir Alavi
(74) *Attorney, Agent, or Firm* — Kilpatrick Townsend & Stockton, LLP

(57) ABSTRACT

Disclosed are an image processing method, apparatus, system and a display device, which can be allowed to perform correction processing on the grayscale of each of the pixels, without any limitation on the shape of the display panel, and have relatively high flexibility. In addition, because the pre-created correction data table has the pixel position, the marker and the correction data contained herein, the correction data are correction data integrated from displaying correction data and edge correction data if the pixel position belongs to the preset edge portion and the correction data are the displaying correction data if the pixel position is other than that belonging to the edge portion, the displaying correction data and the correction data integrated from the displaying correction data and the edge correction data are contained in the correction data table, so that the logic resource occupied in the system can be effectively reduced.

24 Claims, 14 Drawing Sheets

(56) References Cited

U.S. PATENT DOCUMENTS

| | | | | |
|---|---|---|---|---|
| 7,889,250 | B2* | 2/2011 | Aragaki | G06T 1/0007 |
| | | | | 348/222.1 |
| 7,983,507 | B2* | 7/2011 | Kouzaki | G06K 15/02 |
| | | | | 358/3.06 |
| 8,009,931 | B2* | 8/2011 | Li | H04N 1/3878 |
| | | | | 358/3.06 |
| 8,144,145 | B2* | 3/2012 | Morita | G09G 3/3688 |
| | | | | 345/210 |
| 9,282,223 | B1* | 3/2016 | Hsieh | H04N 5/202 |
| 9,779,651 | B2* | 10/2017 | Suginohara | G09G 3/20 |
| 2008/0165212 | A1* | 7/2008 | Morita | G09G 3/3648 |
| | | | | 345/690 |
| 2016/0328601 | A1 | 11/2016 | Ming et al. | |
| 2018/0158434 | A1* | 6/2018 | Bian | G09G 5/06 |
| 2018/0166003 | A1* | 6/2018 | Wang | G06T 5/003 |

FOREIGN PATENT DOCUMENTS

| | | |
|---|---|---|
| CN | 102595033 A | 7/2012 |
| CN | 104505043 A | 4/2015 |
| CN | 104992657 A | 10/2015 |
| CN | 105427258 A | 3/2016 |
| CN | 106469533 A | 3/2017 |
| CN | 106530994 A | 3/2017 |

\* cited by examiner

METHOD AND APPARATUS FOR PERFORMING CORRECTION PROCESSING ON GRAYSCALE OF A PIXEL IN AN IMAGE

CROSS REFERENCE TO RELATED APPLICATION

This application claims priority to Chinese Patent Application No. 201710911245.3, filed with the Chinese Patent Office on Sep. 29, 2017. The entire disclosure of the above application is incorporated herein by reference.

FIELD

The present disclosure relates to the field of displaying technologies, particularly to an image processing method, an image processing apparatus, and a display device.

BACKGROUND

With the development of display screen technologies, full-screens are emerging, which have greater proportion of an active area and an ultra-narrow bezel, compared with a normal display screen, and thus can greatly improve the visual experience. Moreover, to meet a special demand, a display screen may be formed into a special shape, for example, a circle display screen, so as to extend the application range of the display screen. However, whether the display screen is a full-screen or a special shaped display screen, the shapes of its corners are typically different from those of a normal display screen. Taking the full-screen as an example, during manufacturing of the full-screen, to reduce the areas occupied by the bezels as many as possible, the corners are typically shaped to be round corner, as shown in the solid line block of FIG. 1A. As a result, due to the round corners, a phenomenon of contour jaggies easily occurs to the edge portion of the display during displaying an image, which influences displaying effect and viewing experience. In view of this challenge, how to remove the phenomenon of contour jaggies and improve the displaying effect is to be solved.

SUMMARY

An embodiment of the present disclosure provides an image processing method, an image processing apparatus, an image processing system and a display device, for solving the issue in the related art to remove the phenomenon of contour jaggies in the edge portion and improve the displaying effect and viewing experience.

An embodiment of the present disclosure provides an image processing method. The method includes receiving a signal for an image to be displayed. The method further includes that according to a pixel position of each of pixels within an active area of a display panel and a pre-created correction data table containing a pixel position, a marker and correction data, correction processing on the grayscale of each of the pixels in the image to be displayed is performed; where if the pixel position of a pixel belongs to a edge portion, the correction data corresponding to the pixel are correction data integrated from displaying correction data and edge correction data; if the position of the pixel does not belong to the edge portion, the correction data corresponding to the pixel are the displaying correction data. The method further includes displaying the image according to the processed grayscale of each of the pixels.

In another aspect, an embodiment of the present disclosure further provides an image processing apparatus. The image processing apparatus includes a receiving device, a correction processing device and a displaying device. The receiving device is configured to receive a signal for an image to be displayed. The correction processing device is configured, according to a pixel position of each of pixels within the active area of a display panel and a pre-created correction data table containing a pixel position, a marker and correction data, to perform correction processing on grayscale of each of the pixels in the image to be displayed; where if the pixel position of a pixel belongs to a edge portion, the correction data corresponding to the pixel are correction data integrated from displaying correction data and edge correction data; and if the position of the pixel does not belong to the edge portion, the correction data corresponding to the pixel are the displaying correction data. The displaying device is configured to display the image according to the processed grayscale of each of the pixels.

In another aspect, an embodiment of the present disclosure further provides a display device. The display device includes an image processing apparatus. The image processing apparatus includes a receiving device, a correction processing device and a displaying device. The receiving device is configured to receive a signal for an image to be displayed. The correction processing device is configured, according to a pixel position of each of pixels within the active area of a display panel and a pre-created correction data table containing a pixel position, a marker and correction data, to perform correction processing on grayscale of each of the pixels in the image to be displayed; where if the pixel position of a pixel belongs to a edge portion, the correction data corresponding to the pixel are correction data integrated from displaying correction data and edge correction data; and if the position of the pixel does not belong to the edge portion, the correction data corresponding to the pixel are the displaying correction data. The displaying device is configured to display the image according to the processed gray scale of each of the pixels.

DETAILED DESCRIPTION OF THE EMBODIMENTS

One embodiment of the image processing method, the image processing apparatus, the image processing system and the display device according to the present disclosure will be described in details in connection with the accompanying drawings. It should be noted that the described embodiments are only some but not all of embodiments of the present disclosure. Based on the embodiments of the present disclosure, all other embodiments by those of ordinary skill without creative word are within the scope of protection of the present disclosure.

Figure 1A:
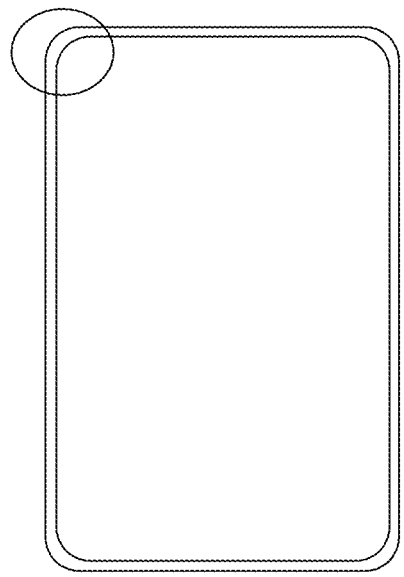
FIG. 1A shows a schematic structural diagram of a full-screen mobile phone in the related art.
Figure 1B:
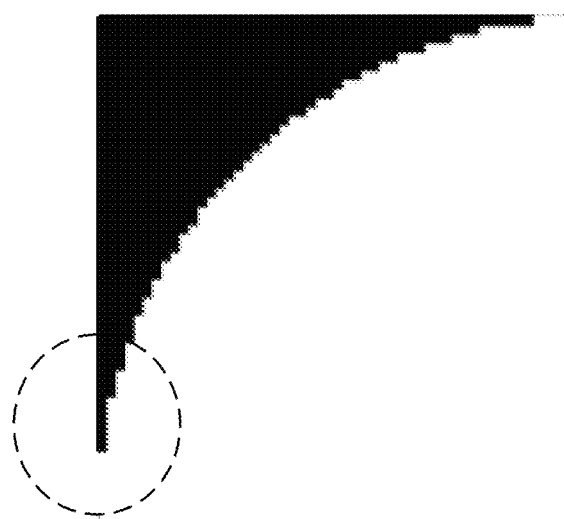
FIG. 1B shows a schematic diagram illustrating the displaying effect of the edge position in a full-screen display device in the related art.

During research, the inventor found that taking a full-screen display device as an example, round corner configuration typically facilities reducing the area occupied by the bezel, as shown in the solid line circle, as shown in FIG. 1A. However, with such configuration, a phenomenon of contour jaggies may occur to the partial edge (i.e. within the solid line circle) of the display panel when an image is displayed, as shown in FIG. 1B, thus influencing the displaying effect and viewing experience.

Figure 1C:
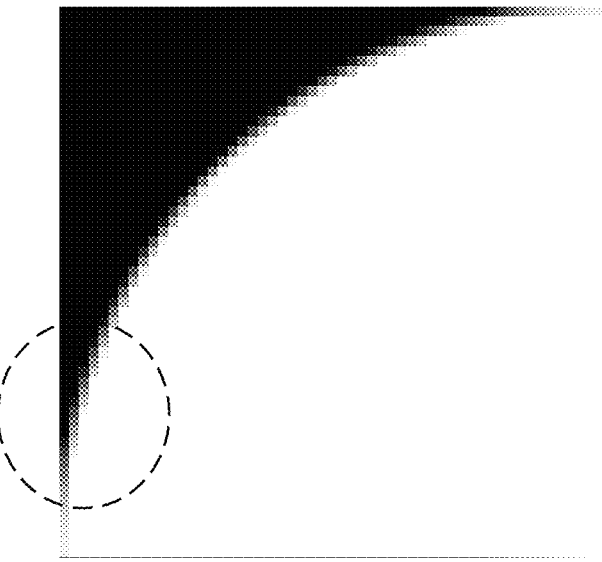
FIG. 1C shows a schematic diagram illustrating the displaying effect of the edge position in a full-screen display device after edge correction is performed in the related art.

To remove the phenomenon of contour jaggies, an edge correction algorithm is typically configured in the driving chip. The core portion of the algorithm is to first define the position of a center point, and then compute the distance of a pixel in the edge region to the center point, and perform correction processing according to the magnitude of the distance. With such algorithm, the displaying effect as shown in the dash line circle of FIG. 1B can be corrected into that displaying effect as shown in the dash line circle of FIG. 1C, thus improving the phenomenon of contour jaggies. However, although such algorithm can remove the phenomenon of contour jaggies, it is only applicable to the edge positions with a standard round corner (as shown in the round corner within the solid line circle of FIG. 1A), and not applicable to the edge position of other shape; moreover, such algorithm is relatively complex and occupies more logic resource in the driving chip, and thus may influence the processing speed of the display.

Therefore, the present disclosure provides an image processing method for implementing edge correction processing meanwhile performing displaying correction; furthermore, edge correction can be performed for any shape of edges, and the problem of high logic resource occupation in the image processing system can be avoided.

Figure 2:
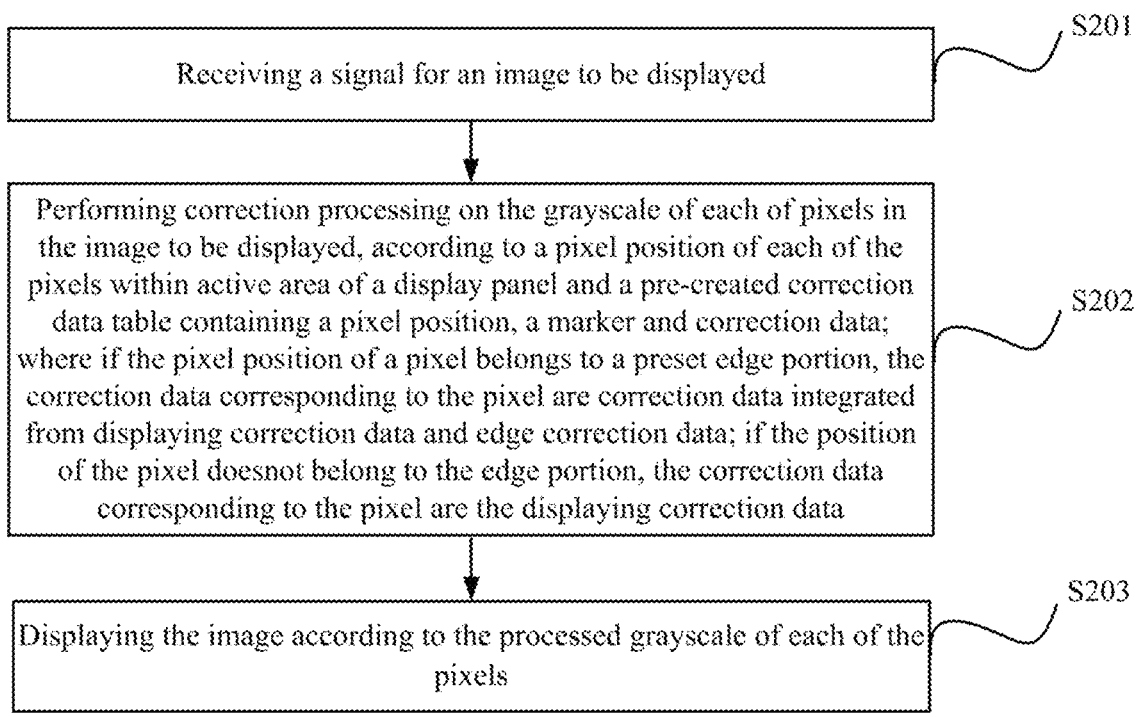
FIG. 2 to FIG. 5 are flow charts of an image processing method according to embodiments of the present disclosure respectively.

The image processing method according to the embodiments of the present disclosure, as shown in FIG. 2, may include:

S201: receiving a signal for an image to be displayed;

S202: performing correction processing on the grayscale of each of pixels in the image to be displayed, according to a pixel position of each of the pixels within active area of a display panel and a pre-created correction data table containing a pixel position, a marker and correction data; where if the pixel position of a pixel belongs to a preset edge portion, the correction data corresponding to the pixel are correction data integrated from displaying correction data and edge correction data; if the position of the pixel does not belong to the edge portion, the correction data corresponding to the pixel are the displaying correction data; and S203: displaying the image according to the processed grayscale of each of the pixels.

It should be noted that, for a normal display screen, the outer contour shape of the active area in the display panel is typically a regular rectangle. For an irregular display screen with a special shape, to meet a specific requirement, the outer contour shape of the active area in the display screen is typically formed into a special shape, for example, a rectangle of rounded corners, a rectangle of rounded corners with a hollow structure on one end, or a circle. When an image is displayed on a display screen with such special shape, a phenomenon of contour jaggies easily occurs to its edge portion, thus influencing viewing experience. Instead, the above described image processing method according to the embodiments of the present disclosure is performed on the grayscale of each of the pixels in the image to be displayed and is not limited to the shape of the display panel, which is applicable to the display panel with any shaped screen (including those display panels of at least one of the above described special display screens) and has relatively high flexibility. Furthermore, because the pre-created correction data table has the pixel position(s), the marker(s) and the correction data contained herein, the correction data corresponding to a pixel are correction data integrated from displaying correction data and edge correction data if the position of the pixel belongs to the preset edge portion and the correction data corresponding to the pixel are the displaying correction data if the position of the pixel does not belong to the preset edge portion. The displaying correction data, and the correction data integrated from the displaying correction data and the edge correction data are both contained in the correction data table, so that the logic resource occupied in the image processing system can be effectively reduced; furthermore, the correction is performed for displaying effect meanwhile the correction is performed for the edge effect of the pixels positioned in the edge portion, thus improving the efficiency and quality of the correction processing.

In one embodiment, the displaying correction on the grayscale of each of the pixels in the image to be displayed is performed for each pixel, regardless of the position of the pixels in the display panel. While in the above described image processing method according to the embodiments of the present disclosure, the displaying correction data and the edge correction data corresponding to the pixels in the edge portion are integrated and stored in the correction data table, so that the correction data table not only contains the displaying correction data but also the correction data integrated from the displaying correction data and the edge correction data, and thus when the correction processing is performed on the grayscale of each of the pixels in the image to be displayed, the edge correction can be implemented meanwhile the displaying correction is implemented. In this way, without logic resource occupation in the system being increased, both of the edge correction and the displaying correction are performed for each of the pixels in the edge portion while the displaying correction is performed for each of those pixels in the non-edge portion, so that not only the displaying effect and viewing experience of the display panel are effectively improved, but also the correction processing speed of the system is increased.

It should be noted that in the above described image processing method according to the embodiments of the present disclosure, when the correction processing is performed on the grayscale of each of the pixels in the image to be displayed, both of the displaying correction and the edge correction are not performed for each of the pixels and instead different correction processing is performed for different pixel depending on the position of the pixel. Therefore, by using two different algorithms, different correction process can be applied to pixels on in different positions, so as to avoid the problem of increased computational effort resulting from the edge correction being performed on those pixels which may not require the edge correction, thus the computational effort of the system can be effectively reduced and the correction processing efficiency can be improved.

Figure 3:
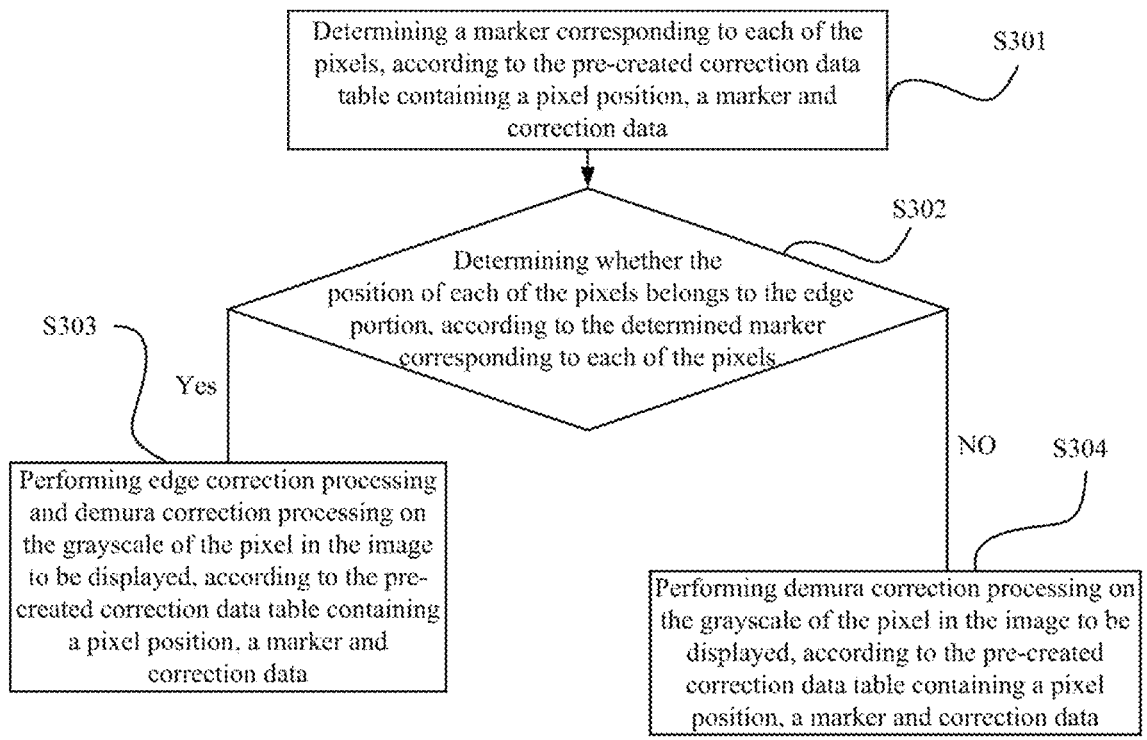

In one embodiment, because of increasingly larger size of the display, mura defects have remarkable influence on the displaying quality and the displaying effect, in which the mura defects are mainly characterized by uneven brightness or color presentation in an effective active area. Therefore, to solve the problem of mura defects, demura technology is introduced, that is, to compensate for and correct the brightness or color in the effective active area, so that the brightness or color in the effective active area can be more uniform. In view of this, when demura correction data is used as the displaying correction data, in step S202 of the above described image processing method according to the embodiments of the present disclosure, the operation of performing correction processing on the grayscale of each of the pixels in the image to be displayed according to a pixel position of each of the pixels within active area of the display panel and the pre-created correction data table containing a pixel position, a marker and correction data, as shown in FIG. 3, may include:

S301: determining a marker corresponding to each of the pixels, according to the pre-created correction data table containing a pixel position, a marker and correction data;

S302: determining whether the position of each of the pixels belongs to the edge portion, according to the determined marker corresponding to each of the pixels; if so, then performing step S303; if not, then performing step S304;

S303: performing edge correction processing and demura correction processing on the grayscale of the pixel in the image to be displayed, according to the pre-created correction data table containing a pixel position, a marker and correction data; and S304: performing demura correction processing on the grayscale of the pixel in the image to be displayed, according to the pre-created correction data table containing a pixel position, a marker and correction data.

In one embodiment, in the pre-created correction data table, the correction data corresponding to a pixel with a position belonging to the edge portion are the correction data integrated from the demura correction data and the edge correction data, while the correction data corresponding to the pixel with a position not belonging to the edge portion are the demura correction data. As can be seen, both of the demura correction and the edge correction are performed on a pixel only if the position of the pixel belongs to a preset edge portion, and only demura correction is performed on the pixel if the position of the pixel does not belong to the edge position. Therefore, in the above described image processing method according to the embodiments of the present disclosure, in order to perform different correction processing on each of the pixels according to the positions of the pixels and different correction data corresponding to different pixels, the marker is introduced to the correction data table. Since different markers correspond to different pixels, it can be determined which correction processing may be performed for the pixel, and thus the accuracy and efficiency of correction processing can be greatly increased.

Figure 4:
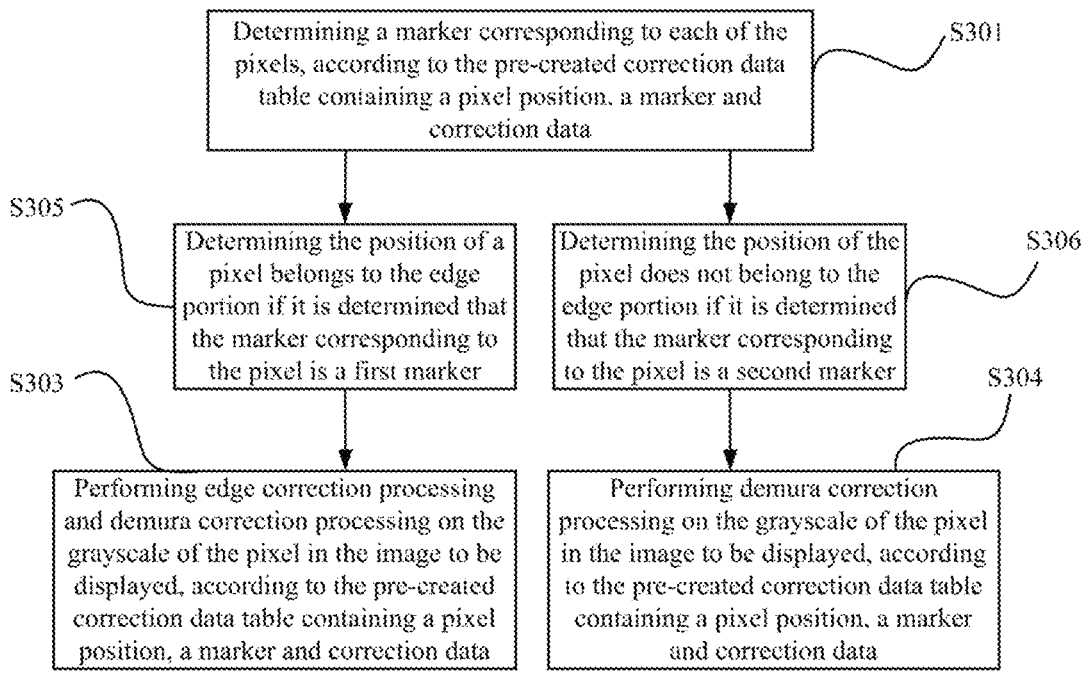

In one embodiment, to make it possible to determine whether the position of a pixel belongs to the edge portion according to the marker in the pre-created correction data table, in S302 of the above described image processing method according to the embodiments of the present disclosure, the operation of determining whether the position of each of the pixels belongs to the edge portion, according to the determined marker corresponding to each of the pixels, as shown in FIG. 4, may include:

S305: determining the position of a pixel belongs to the edge portion if it is determined that the marker corresponding to the pixel is a first marker; and S306: determining the position of the pixel does not belong to the edge portion if it is determined that the marker corresponding to the pixel is a second marker.

With the above operations, it can be exactly determined whether the position of a pixel belongs to the edge portion according to the determined marker corresponding to the pixel and further it can be determined whether only the demura correction processing or both of the demura correction processing and the edge correction processing may be performed on the pixel, thus improving the accuracy and efficiency of the correction processing.

Figure 5:
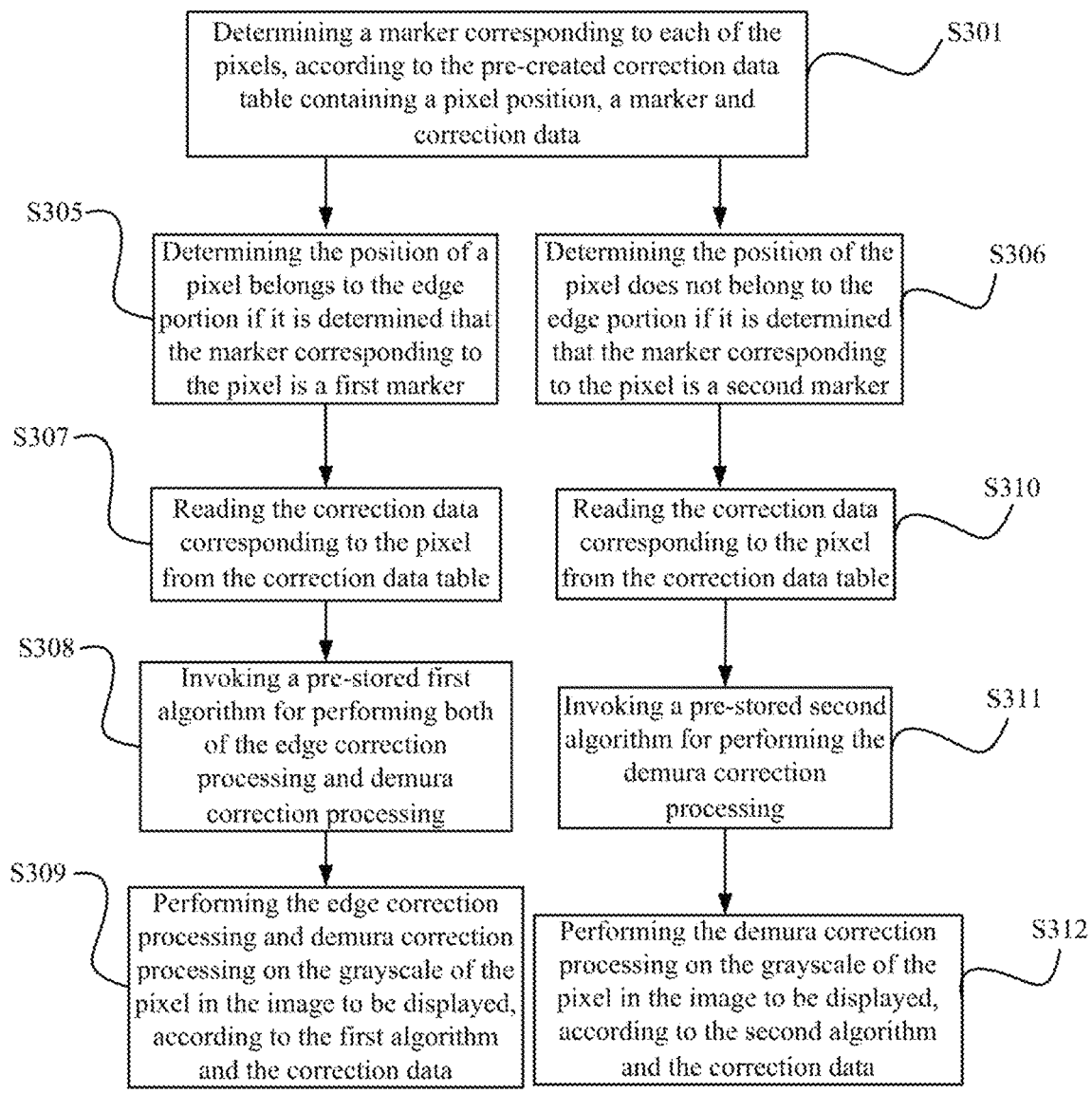

Further, if it is determined that the position of the pixel belongs to the edge portion, both of the demura correction processing and the edge correction processing may need to be performed on the pixel. In one or more embodiment of the disclosure, the operation of performing the edge correction processing and demura correction processing on the grayscale of the pixel in the image to be displayed, according to the pre-created correction data table containing a pixel position, a marker and correction data, as shown in FIG. 5, may include:

S307: reading the correction data corresponding to the pixel from the correction data table;

S308: invoking a pre-stored first algorithm for performing both of the edge correction processing and demura correction processing; and S309: performing the edge correction processing and demura correction processing on the grayscale of the pixel in the image to be displayed, according to the first algorithm and the correction data.

In one embodiment, before both of the demura correction processing and the edge correction processing are performed on the pixel which belongs to the edge portion in the image to be displayed, the order of the two steps of reading the correction data corresponding to the pixel, and invoking the first algorithm pre-stored, is not limited to the above description; rather, the first algorithm may be invoked at first, and then the correction data corresponding to the pixel are read, as long as the correction data corresponding to the pixel can be read and the first algorithm can be invoked before the correction processing is performed on the gray scales of the pixels in the image to be displayed, so that the edge correction can be implemented meanwhile the demura correction is implemented, and no limitation is made thereto.

In one embodiment, the pre-stored first algorithm for performing both of the edge correction processing and demura correction processing may be designed appropriately depending on a specific demand, and no limitation is made thereto.

Further, if it is determined that the position of the pixel does not belong to the edge portion, only the demura correction processing may need to be performed on the pixel. In one or more embodiment of the disclosure, the operation of performing demura correction processing on the grayscale of the pixel in the image to be displayed, according to the pre-created correction data table containing a pixel position, a marker and correction data, as shown in FIG. 5, may include:

S310: reading the correction data corresponding to the pixel from the correction data table;

S311: invoking a pre-stored second algorithm for performing the demura correction processing; and S312: performing the demura correction processing on the grayscale of the pixel in the image to be displayed, according to the second algorithm and the correction data.

In one embodiment, before the demura correction processing is performed on the pixel not belonging to the edge portion in the image to be displayed, the order of the two steps of reading the correction data corresponding to the pixel, and invoking the second algorithm, is not limited to the above description; rather, the second algorithm may be invoked at first, and then the correction data corresponding to the pixel is read, as long as the correction data corresponding to the pixel can be read and the second algorithm can be invoked before the correction processing is performed on the grayscales of the pixels in the image to be displayed, so that the demura correction is performed, and no limitation is made thereto.

In one embodiment, the pre-stored second algorithm for performing the demura correction processing may be a commonly used algorithm in the related art, and alternatively may be an algorithm specifically designed depending on an actual demand, as long as the demura correction processing can be performed on the grayscale of the pixel, and no limitation is made thereto.

Figure 6:
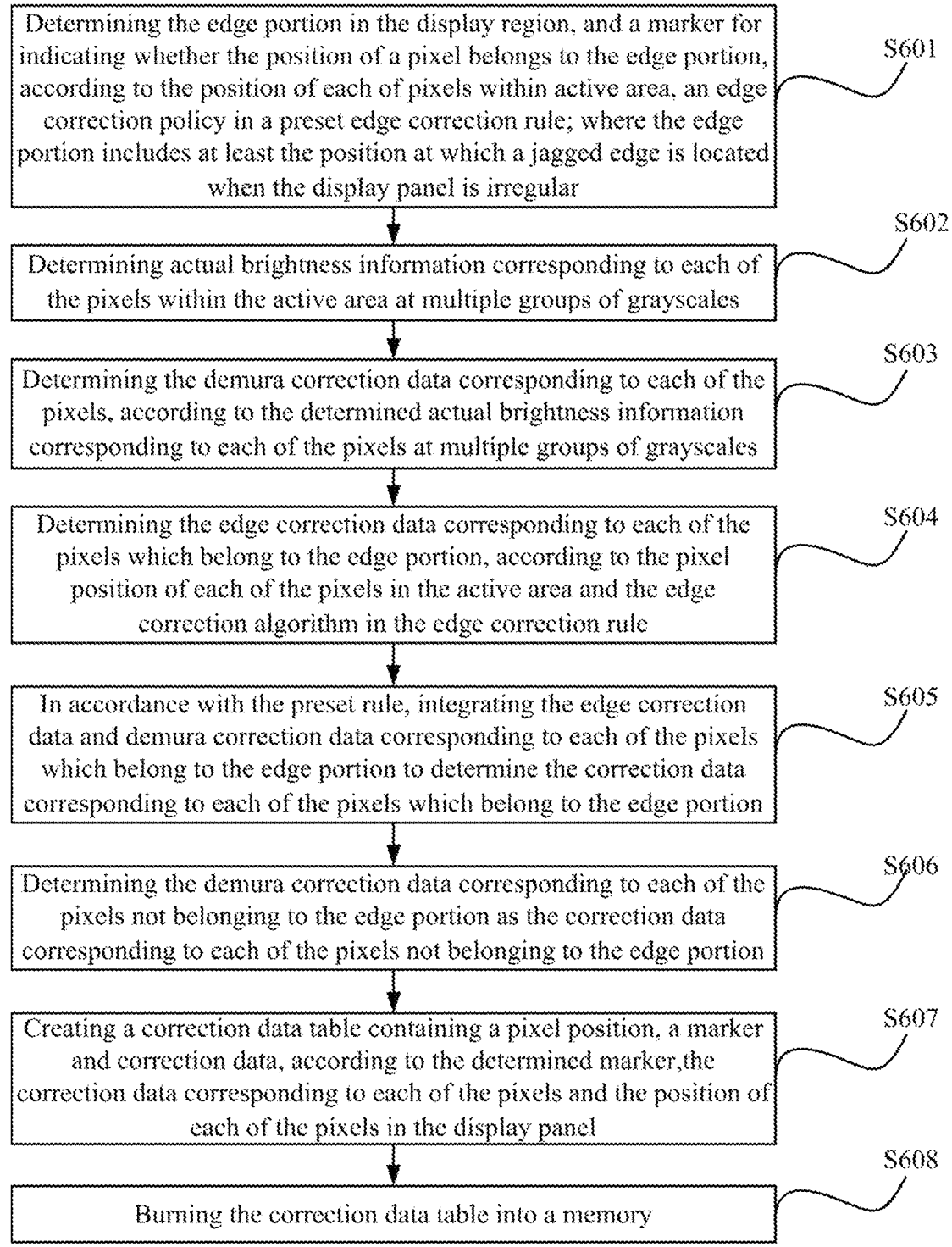
FIG. 6 shows a flow chart of a method for creating a correction data table containing a pixel position, a marker and correction data according to an embodiment of the present disclosure.

In a specific implementation, to make it possible to perform different correction processing for different pixels, at first, a marker is introduced into the correction data table, and then by reading a marker, it can be directly determined which of the correction processing approaches may be performed for the pixel. Furthermore, to implement the demura correction processing and edge correction processing on the grayscale of a pixel in the edge portion, and avoid relatively large occupation of logic resource in the image processing system, the edge correction data and the demura correction data can be integrated to into a correction data table. In view of this, one key of the invention is to create a correction data table containing the makers, the correction data integrated from the edge correction data and the demura correction data, and the demura correction data. Therefore, in the above described image processing method according to the embodiments of the present disclosure, as shown in FIG. 6, before receiving the signal for the image to be displayed, the operation of creating a correction data table containing a pixel position, a marker and correction data may include:

S601: determining the edge portion in the display region, and a marker for indicating whether the position of a pixel belongs to the edge portion, according to the position of each of pixels within active area, an edge correction policy in a preset edge correction rule; where the edge portion includes at least the position at which a jagged edge is located when the display panel is irregular;

S602: determining actual brightness information corresponding to each of the pixels within the active area at multiple groups of grayscales;

S603: determining the demura correction data corresponding to each of the pixels, according to the determined actual brightness information corresponding to each of the pixels at multiple groups of grayscales;

S604: determining the edge correction data corresponding to each of the pixels which belong to the edge portion, according to the pixel position of each of the pixels in the active area and the edge correction algorithm in the edge correction rule;

S605: in accordance with the preset rule, integrating the edge correction data and demura correction data corresponding to each of the pixels which belong to the edge portion to determine the correction data corresponding to each of the pixels which belong to the edge portion;

S606: determining the demura correction data corresponding to each of the pixels not belonging to the edge portion as the correction data corresponding to each of the pixels not belonging to the edge portion; and S607: creating a correction data table containing a pixel position, a marker and correction data, according to the determined marker, the correction data corresponding to each of the pixels and the position of each of the pixels in the display panel.

In one embodiment, the created correction data table containing the pixel position, the marker and the correction data can be stored for subsequent use. After the step S607 of creating the correction data table containing the pixel position, the marker and the correction data, the above described image processing method according to the embodiments of the present disclosure can further include, as shown in FIG. 6: step S608 of burning the correction data table into a memory, for invoking, reading or storing by other device (for example, the driving chip), and reducing the internal storage occupied in the driving chip.

In one embodiment, the memory may be a flash memory; in other embodiments, the memory may also be another memory, as long as the memory can store the correction data table, and no limitation is made thereto. In addition, many devices are included in the image processing system, such as the driving chip and the flash memory. After the created correction data table is stored in the flash memory and before the display panel is driven by the driving chip to display an image, the correction data table is invoked from the flash memory. After a signal for the image to be displayed is received, correction processing is performed on the grayscale of each of the pixels by the driving chip according to the invoked correction data table, the processed grayscale of each of the pixels is output for displaying the image. Because the correction data table is stored in advance in the flash memory, the logic resource occupied inside the driving chip can be reduced, and thus the operating speed of the driving chip can be increased.

In one embodiment, in order to facilitate data transfer, the transmitted data is typically in a form of a zipped package during data transfer between different devices. Therefore, when the correction data table is invoked by the driving chip from the flash memory, a zipped package containing the correction data table is actually invoked, and then unzipped by the driving chip to obtain the correction data table, for correction processing on each of the pixels in the image to be displayed.

Figure 7A:
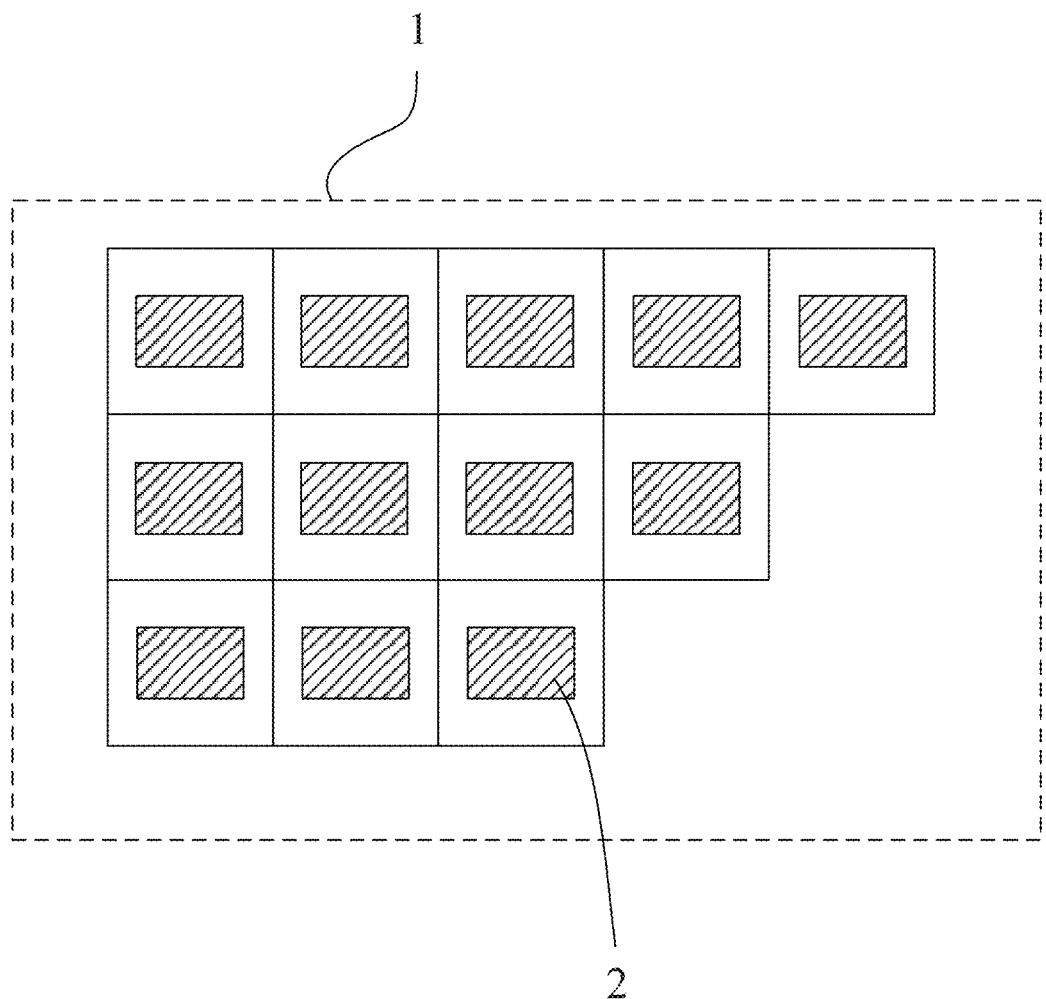
FIG. 7A shows a schematic structural diagram of a correction data table according to an embodiment of the present disclosure.

In a specific implementation, during creating of the correction data, to facilitate reading the correction data corresponding to each of the pixels and improve the speed of image processing, in the above described image processing method according to the embodiments of the present disclosure, as shown in FIG. 7A, the position at which each of the pixels is located in the correction data table 1 may be mapped one by one into the position at which each of the pixels is located in the active area, and a correction data group 2 containing a marker and correction data corresponding to a pixel is stored in the position at which the pixel is located in the correction data table 1.

Figure 7B:
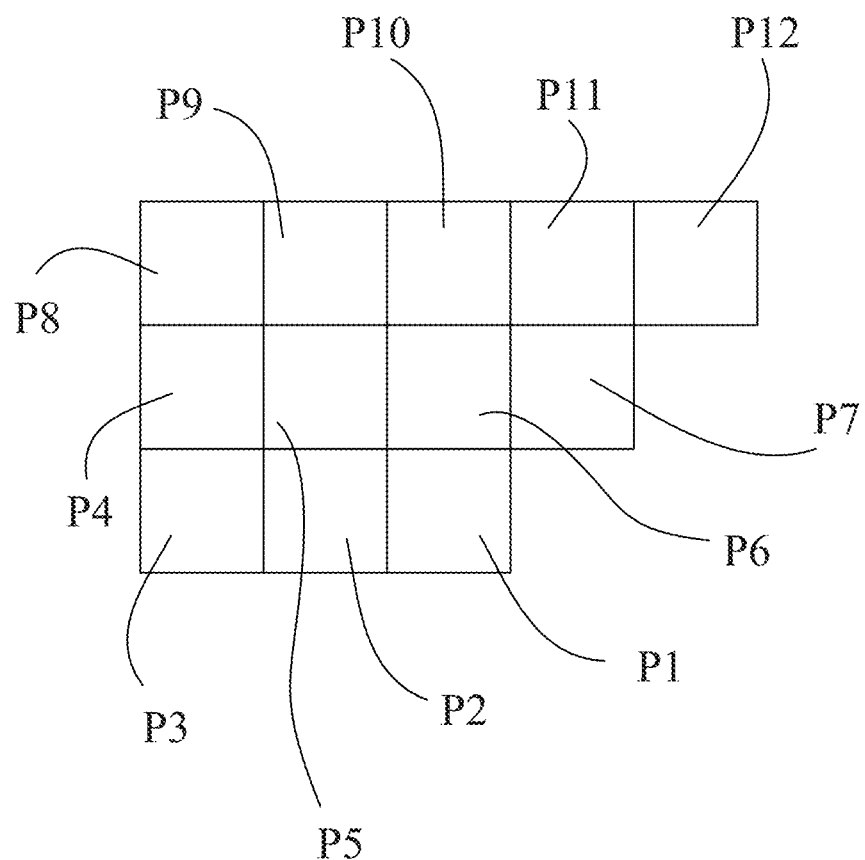
FIG. 7B shows a schematic structural diagram of pixel layout in a display panel according to an embodiment of the present disclosure.

In one embodiment, as shown in FIG. 7A and FIG. 7B, taking 12 pixels (for example, pixel P1 to pixel P12) as an example, FIG. 7A shows the layout of the markers and correction data corresponding to each of the pixels in the correction data table 1, and FIG. 7B shows the layout of the pixels in the display panel. Taking pixel P8 as an example, that pixel P8 being in the upper left corner of FIG. 7B indicates that the pixel position of pixel P8 is also in the upper left corner of FIG. 7A. Furthermore, a correction data group 2 containing the marker and correction data of pixel P8 is stored in the position in the upper left corner. In this way, when correction processing is performed on the grayscale of each of the pixels by the driving chip, the correction data corresponding to each of the pixels can be read rapidly, to implement the demura correction processing and edge correction processing for the pixels which belong to the edge portion, and implement the demura correction processing for the pixels not belonging to the edge portion, and thus improving the efficiency of image processing.

Further, in the above described image processing method according to the embodiments of the present disclosure, the correction data group 2 includes n bits; m bits for a marker, n−m bits for correction data; where m is 1 or 2, and n is 8 or 10. For example, as shown in FIG. 8A, when n is 8 and m is 1, 1 bit is for a marker 2a and 7 bits are for correction data 2b in a correction data group 2.

Figure 8A:
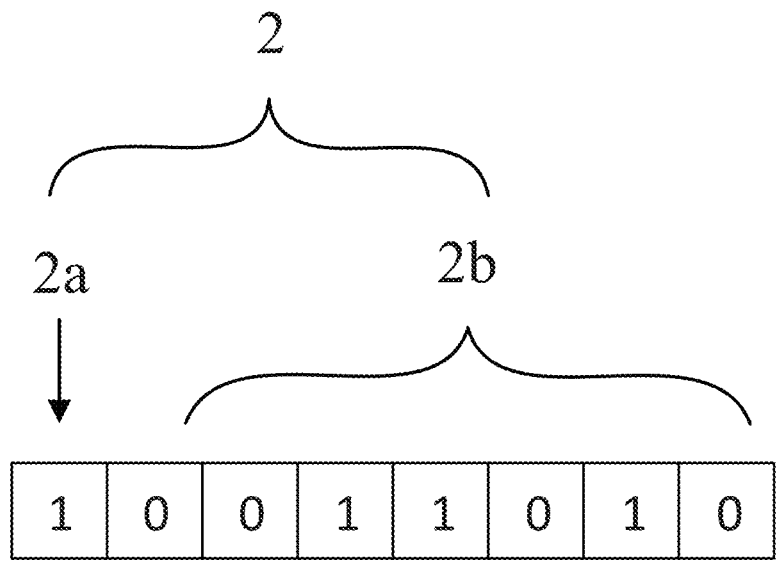
FIG. 8A shows a schematic structural diagram of a correction data group according to an embodiment of the present disclosure.
Figure 8B:
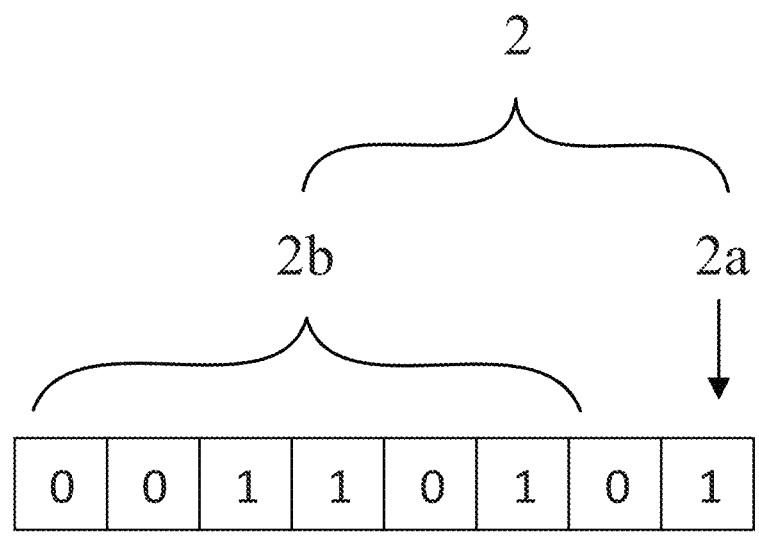
FIG. 8B shows a schematic structural diagram of a correction data group according to another embodiment of the present disclosure.

In one embodiment, in the correction data group 2, the marker 2a may be located in the first several bit(s) in the correction data group 2, and the correction data 2a follows the marker 2a, as shown in FIG. 8A; alternatively, as shown in FIG. 8B, the correction data 2a may be located in the first several bit(s) in the correction data group 2, and the marker 2a follows correction data 2b. In addition, the marker 2a may be located in a middle position in the correction data group 2, and the correction data 2b may be located in a border position in the correction data group 2 (not shown), and no limitation is made thereto.

In one embodiment, the marker may be "1" or "0"; when the marker is 1, it means that the position of a pixel belongs to the edge portion, so that during correction processing for the pixel, both of the demura correction processing and the edge correction processing may need to be performed, and the corresponding algorithm is the first algorithm for performing both of the edge correction processing and demura correction processing. When the marker is 0, it means that the position of the pixel does not belong to the edge portion, so that during correction processing for the pixel, only the demura correction processing is performed, and the corresponding algorithm is the second algorithm for performing demura correction processing. In one embodiment, the marker is not limited to be "1" or "0"; and it may further be other digit, letter or special character which is easily read and recognized by the driving chip, as long as it can be determined by the marker whether the pixel position of a pixel belongs to the edge portion, so that the corresponding correction processing is performed for the pixel by the driving chip, and no limitation is made thereto.

Further, for two pixels with positions both belonging to the edge portion, the respective correction data thereof are different, and used to differently perform correction processing for the different pixels, so as to remove the phenomenon of contour jaggies, make the displayed picture more uniform and improve displaying effect. In one embodiment, for two pixels with positions not belonging to the edge portion, the respective correction data thereof are different too, so as to differently perform demura correction processing for the different pixels, to facilitate improving the uniformity of displayed picture.

Figure 9:
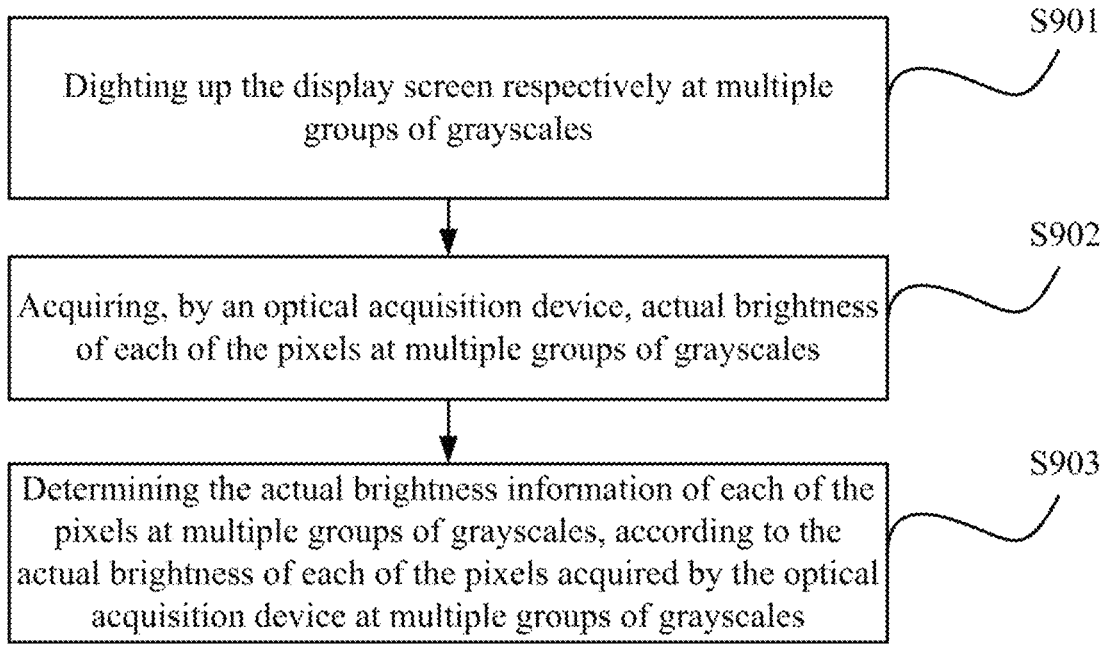
FIG. 9 shows a flow chart of a method for determining actual brightness information for each of the pixels according to an embodiment of the present disclosure.

In a specific implementation, in order to make it possible to exactly determine actual brightness information corresponding to each of the pixels at multiple groups of grayscales, to further determine the demura correction data corresponding to each of the pixels, in step S602 of the above described image processing method according to the embodiments of the present disclosure, determining actual brightness information corresponding to each of the pixels within the active area at multiple groups of grayscales, as shown in FIG. 9, may include:

S901: lighting up the display screen respectively at multiple groups of grayscales;

S902: acquiring, by an optical acquisition device, actual brightness of each of the pixels at multiple groups of grayscales; and S903: determining the actual brightness information of each of the pixels at multiple groups of grayscales, according to the actual brightness of each of the pixels acquired by the optical acquisition device at multiple groups of grayscales.

Figure 10:
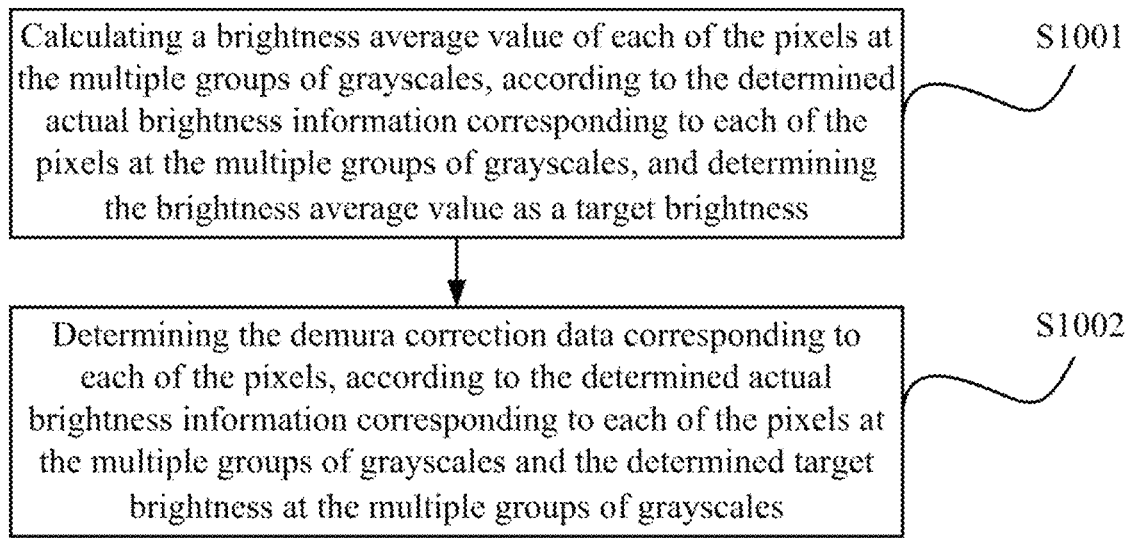
FIG. 10 shows a flow chart of a method for determining demura correction data for each of the pixels according to an embodiment of the present disclosure.

In one embodiment, in order to make it possible to determine the demura correction data corresponding to each of the pixels, in step S603 of the above described image processing method according to the embodiments of the present disclosure, determining the demura correction data corresponding to each of the pixels, according to the determined actual brightness information corresponding to each of the pixels at multiple groups of grayscales, as shown in FIG. 10, may include:

S1001: calculating a brightness average value of each of the pixels at the multiple groups of grayscales, according to the determined actual brightness information corresponding to each of the pixels at the multiple groups of grayscales, and determining the brightness average value as a target brightness; and S1002: determining the demura correction data corresponding to each of the pixels, according to the determined actual brightness information corresponding to each of the pixels at the multiple groups of gray scales and the determined target brightness at the multiple groups of grayscales.

Figure 11:
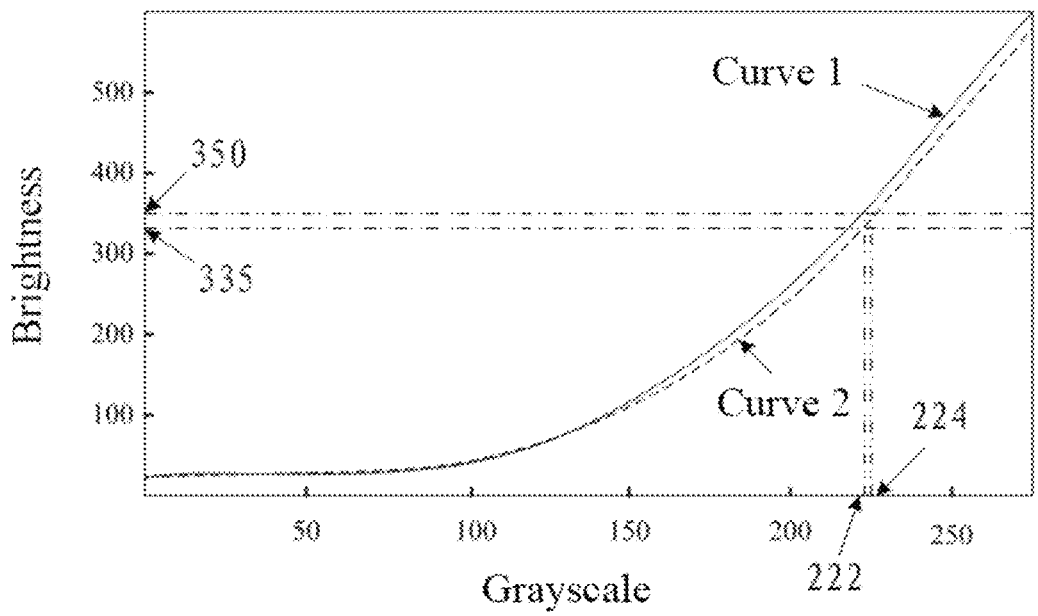
FIG. 11 shows a graph of grayscale-brightness according to an embodiment of the present disclosure.

In one embodiment, as shown in FIG. 11, the abscissa represents the grayscale of each of the pixels, and the ordinate represents the brightness corresponding to each of the grayscales; curve 1 is a target brightness curve, and curve 2 is an actual brightness curve at the groups of grayscales. Taking pixel PX as an example, when the grayscale of the pixel PX is 222, the relevant brightness on the target brightness curve may be 350, and the relevant brightness on the actual brightness curve is 335. It can be seen that when the grayscale of the pixel PX is 222, the expected brightness is not reached, thus resulting in uneven displaying effect on the display panel. However, when the grayscale of the pixel PX is 224, the relevant brightness on the actual brightness curve is 350. Therefore, to allow the actual brightness of the pixel X to be 350, the grayscale of the pixel PX may need to be corrected, that is, the grayscale of the pixel PX is corrected from 222 to 224, and then the demura correction data of the pixel PX is 2. In this way, the demura correction processing is implemented on the grayscale of the pixel PX, so as to facilitate alleviating the uneven light emitting problems of the display panel; similarly, the demura correction data of other pixels are acquired in the same manner, and no repeated description thereof is given.

In a specific implementation, to reduce the contour jaggies occurring to the image portion located in the edge portion of the display panel which is round shaped, the edge correction rule is to smoothing process the contour jaggies in the edge portion, that is, to gradually reduce the brightness of the pixels to be corrected by the edge correction processing along the extending direction from the center of the display panel to the edge portion, so that instead of the contour jaggies, a smoothing transitional zone is exhibited when the image is viewed. In one embodiment, the edge correction policy in the edge correction rule is to set the width of the transitional zone, that is, how many pixels in the edge portion may need to be corrected by the edge correction processing. Therefore, according to the edge correction policy in the edge correction rule and the position information of each of the pixels, it can be determined how many pixels need to be corrected by the edge correction processing and how many pixels do not need to be corrected by the edge correction processing. Further, the pixel positions of the pixels which may need to be corrected by the edge correction processing is allowed to be classified into the edge positions (that is, belong to the edge portion), the pixel positions of the pixels which need not to be corrected by the edge correction processing is allowed to be classified into the non-edge positions (that is, not belong to the edge portion), thus facilitating differentiated correction processing on different pixels by the driving chip, and improving the accuracy and efficiency of the correction processing.

Figure 12:
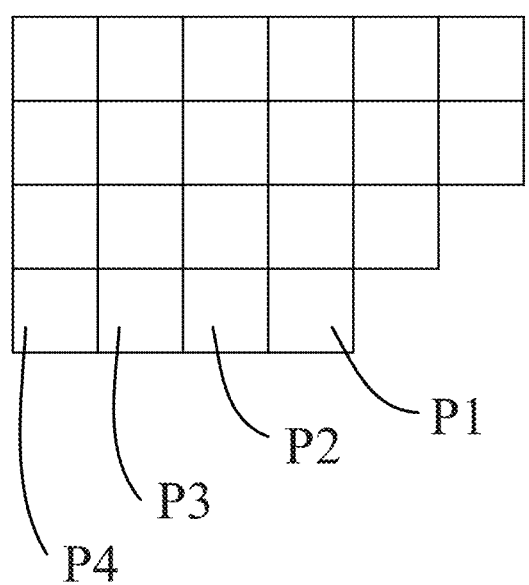
FIG. 12 shows a schematic structural diagram of partial pixel layout according to an embodiment of the present disclosure.

In one embodiment, as shown in the structural diagram of the partial pixel layout in FIG. 12, if it is determined that the pixel positions of pixels P1 to P3 belong to the edge portion according to edge correction policy of the edge correction rule, then the pixels P1 to P3 may need to be corrected by the edge correction processing; and if it is determined that the pixel position of pixel P4 does not belong to the edge portion according to edge correction policy of the edge correction rule, then the pixel P4 need not to be corrected by the edge correction processing, and only the demura correction processing is performed. Therefore, the marker corresponding to the pixel P4 may be 0 (1 indicates that the position of the pixel belongs to the edge portion), and the relevant correction data are demura correction data; and the markers corresponding to the pixels P1 to P3 are 1, the relevant correction data is the correction data integrated from the demura correction data and the edge correction data.

Further, to implement smoothing process on the contour jaggies in the edge portion, in the above described image processing method according to the embodiments of the present disclosure, the edge correction rule at least specifies that as the pixel is closer to the edge of the display panel, the value of the edge correction data for the pixel becomes smaller.

In one embodiment, to determine the edge correction data of the pixels P1 to P3, there may be several approaches, for example, the edge correction data for each of the pixels P1 to P3 can be determined according to the distance L of each of the pixels P1 to P3 from the edge of the display panel. For example, if the pixel P1 is located in the edge portion, then the distance L of the pixel P1 may be set to 0, and if the pixel P2 is positioned adjacent to the pixel P1 in the row direction, then the distance L of the pixel P2 may be set to 1; similarly, the distance L of the pixel P3 may be set to 2.

In one embodiment, the brightness may be reduced by n orders of magnitude, and then the Xth order of the brightness coefficient is n−x/n, and then according to the magnitudes of the distances L of the pixels P1 to P3 from the edge of the display panel, a value X corresponding to the distance L is preset. For example, if n is 8, assuming that the distances L of the pixels P1 to P3 from the edge of the display panel are 0, 1 and 2 respectively, and the corresponding values of X are 7, 4 and 1 respectively, then the brightness coefficients of the pixel P1 to P3 are ⅛, ⅘ and ⅞ respectively, that is, the edge correction data for the pixels P1 to P3 are ⅛, ⅘ and ⅞ respectively.

Since each pixel typically contains at least three sub-pixels, further adjustment may be performed on the brightness of each of the sub-pixels when the edge correction data for the pixels P1 to P3 are determined, so as to implement the edge correction processing. The edge correction data for each of the sub-pixels may be specifically determined according to the actual number of the sub-pixels and the edge correction policy to be satisfied; and other method similar to the above described image processing method may be used, and no limitation is made thereto.

Further, the determined edge correction data and demura correction data for the pixels P1 to P3 are integrated according to a specific rule to generate correction data, and the correction data can be stored in the correction data table. In one embodiment, the edge correction data and demura correction data may be integrated according to actual requirement, and no limitation is made thereto.

In addition, there may be several forms for storing the correction data in the correction data table. In a first form, the determined values of the correction data may be directly stored in the correction data table, so that the values can be directly obtained during reading by the driving chip. In a second form, a lookup table can be created when the correction data table is created. Taking the correction data in the correction data groups shown in FIG. 8A as an example, if first 1 bit represents the marker, and the following 7 bits represent the correction data, and the correction data may consist of 0 and 1, then there is a value in the lookup table corresponding to every 7-bit correction data; for example, the correction data for the pixel P1 stored in the correction data table is 0011010, and the value in the lookup table corresponding to 0011010 is X, then the correction data for the pixel P1 is X. Furthermore, the lookup table and the correction data table both may be stored in a flash memory, so that when the correction data table is invoked by the driving chip, the correction data table and the lookup table together are obtained, thus facilitating relevant correction processing on each of the pixels.

It should be noted that the display panel to which the above described image processing method according to the embodiments of the present disclosure is applicable may be a liquid crystal display panel, or an electroluminescent display panel, for example, an OLED display panel; as long as the display panel has a round shaped edge and corner, or any other shapes, the above described image processing method according to the embodiments of the present disclosure may be applicable, where the edge correction processing is implemented meanwhile the demura correction processing is performed on the display panel, thus improving the displaying effect of the display panel.

Figure 13:
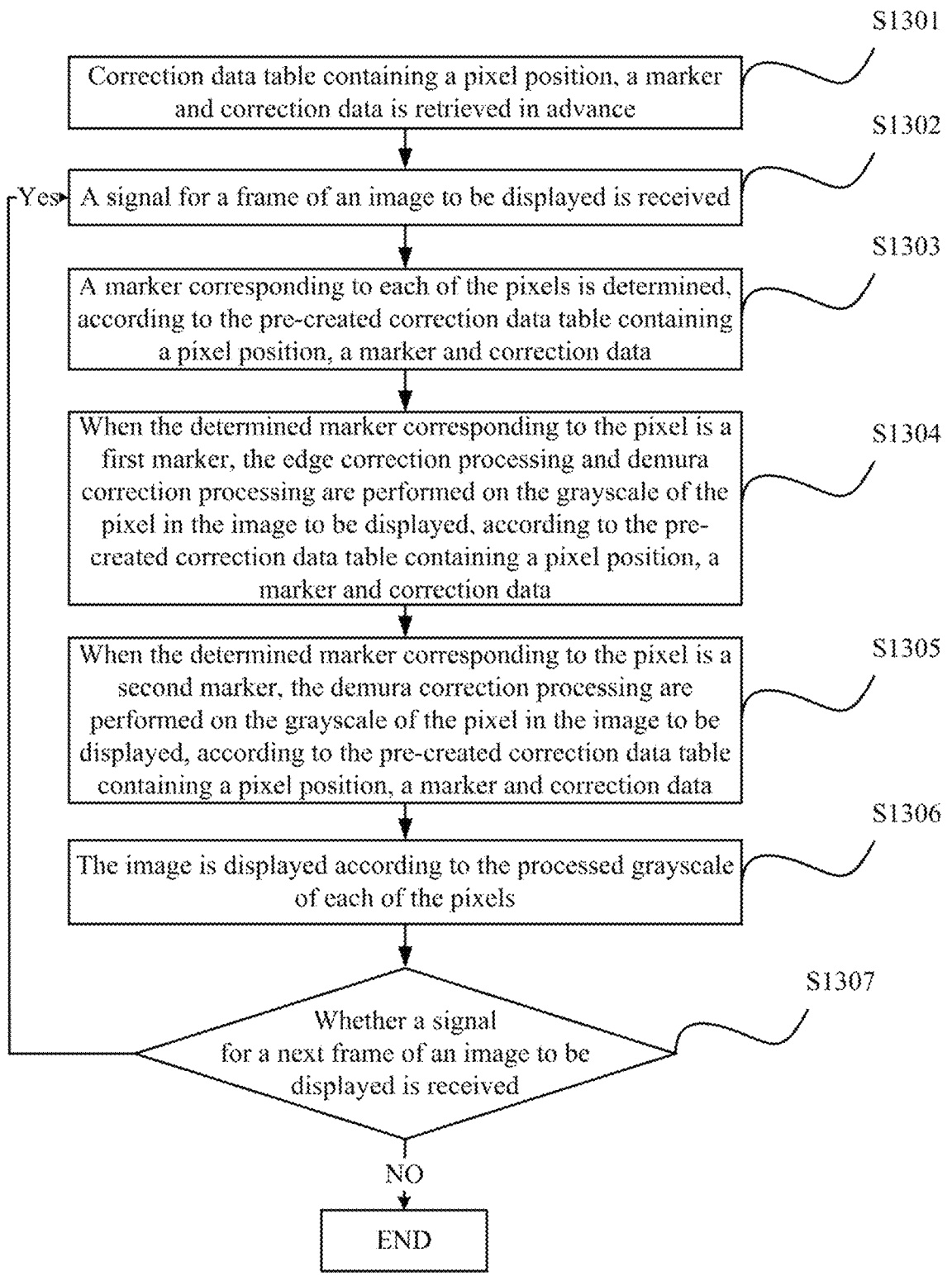
FIG. 13 shows a flow chart of an image processing method according to a one embodiment of the present disclosure.

The foregoing image processing method according to the present disclosure will be described below in further detail with respect to a specific embodiment, as shown in FIG. 13, the method include:

S1301: correction data table containing a pixel position, a marker and correction data is retrieved in advance;

S1302: a signal for a frame of an image to be displayed is received;

S1303: a marker corresponding to each of the pixels is determined, according to the pre-created correction data table containing a pixel position, a marker and correction data;

S1304: when the determined marker corresponding to the pixel is a first marker, the edge correction processing and demura correction processing are performed on the grayscale of the pixel in the image to be displayed, according to the pre-created correction data table containing a pixel position, a marker and correction data;

S1305: when the determined marker corresponding to the pixel is a second marker, the demura correction processing are performed on the grayscale of the pixel in the image to be displayed, according to the pre-created correction data table containing a pixel position, a marker and correction data;

S1306: the image is displayed according to the processed grayscale of each of the pixels; and S1307: it is determined whether a signal for a next frame of an image to be displayed is received; if yes, return to step S1302; if no, the process ends.

Based on the same invention idea, an embodiment of the present disclosure provides an image processing apparatus. Because the principle of the image processing apparatus is similar to that of the foregoing image processing method, the image processing apparatus according to an embodiment of the disclosure may be implemented with respect to the foregoing image processing method, and no repeated description thereof is given.

Figure 14:
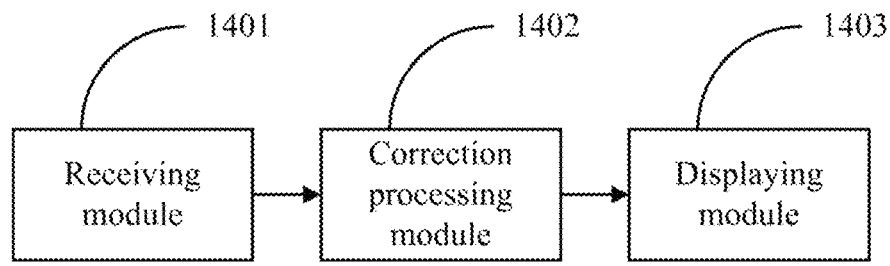
FIG. 14 shows a schematic structural diagram of an image processing apparatus according to an embodiment of the present disclosure.

The above described image processing apparatus according to an embodiment of the present disclosure, as shown in FIG. 14, may include:

a receiving device 1401 configured to receive a signal for an image to be displayed;

a correction processing device 1402 configured to perform correction processing on grayscale of each of pixels in the image to be displayed, according to a pixel position of each of the pixels within active area of a display panel and a pre-created correction data table containing a pixel position, a marker and correction data; where if the position of a pixel belongs to a preset edge portion, the correction data corresponding to the pixel are correction data integrated from displaying correction data and edge correction data; if the position of the pixel does not belong to the edge portion, the correction data corresponding to the pixel are the displaying correction data; and a displaying device 1403 configured to display the image according to the processed grayscale of each of the pixels.

In the above described image processing apparatus according to an embodiment of the present disclosure, after a signal for the image to be displayed is received, correction processing can be performed on the grayscale of each of the pixels in the image to be displayed and is not limited to the shape of the display panel, which is applicable to the display panel with any shaped screen and has relatively high flexibility. Furthermore, because the pre-created correction data table has the pixel position(s), the marker(s) and the correction data contained herein, the correction data corresponding to a pixel are correction data integrated from displaying correction data and edge correction data if the position of the pixel belongs to the preset edge portion and the correction data corresponding to the pixel are the displaying correction data if the position of the pixel does not belong to the preset edge portion. The displaying correction data, and the correction data integrated from the displaying correction data and the edge correction data are both contained in the correction data table, so that the logic resource occupied in the image processing system can be effectively reduced; furthermore, the correction is performed for displaying effect meanwhile the correction is performed for the edge effect of the pixels positioned in the edge portion, thus improving the efficiency and quality of the correction processing.

In a specific implementation, in the above described image processing apparatus according to an embodiment of the present disclosure, the displaying correction data are demura correction data.

Figure 15:
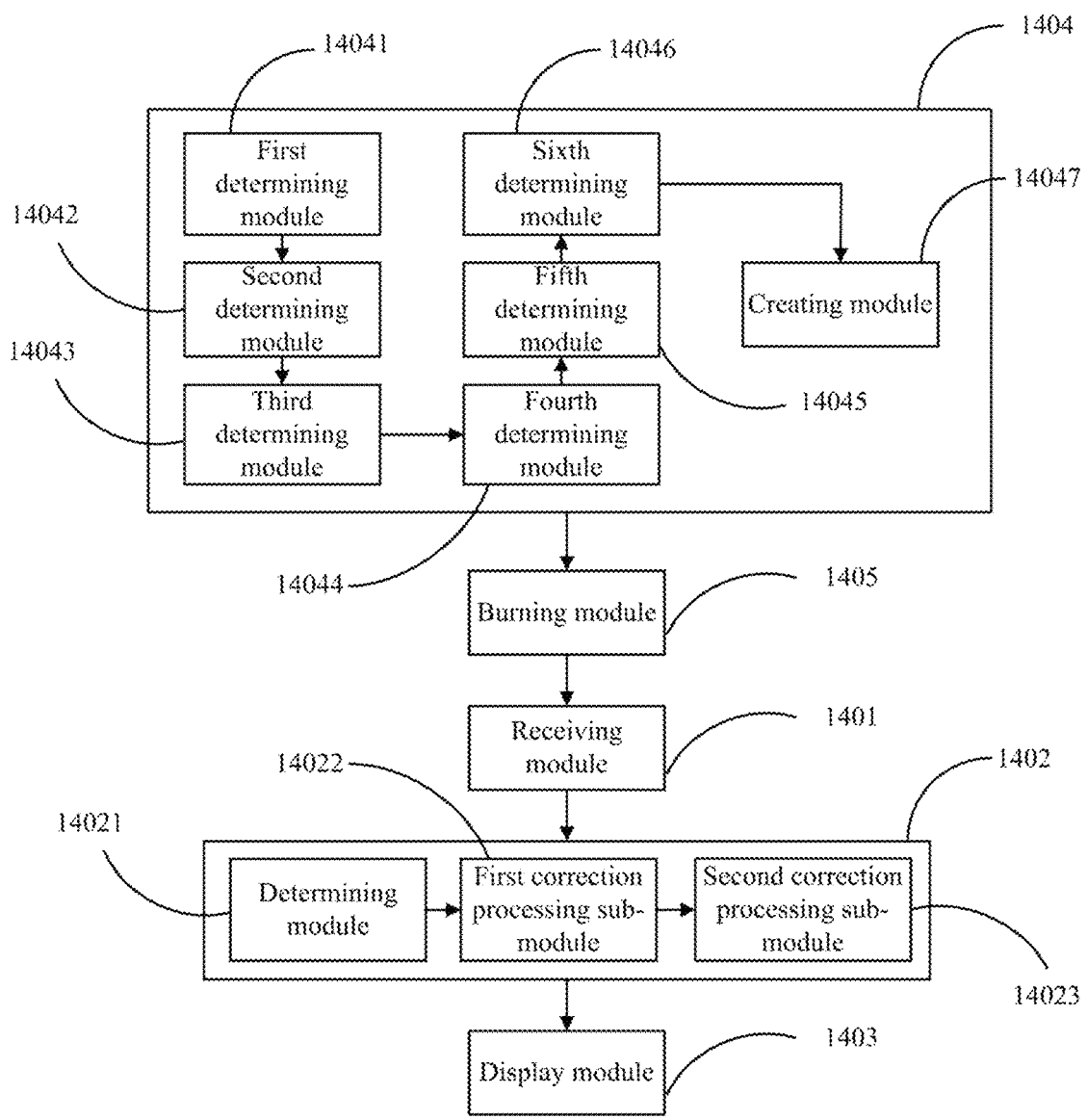
FIG. 15 shows a schematic structural diagram of an image processing apparatus according to another embodiment of the present disclosure.

As shown in FIG. 15, the correction processing device 1402 may include: a determining device 14021, a first correction processing sub-device 14022 and a second correction processing sub-device 14023.

The determining device 14021 is configured to determine a marker corresponding to each of the pixels, according to the pre-created correction data table containing a pixel position, a marker and correction data, and to determine whether the position of each of the pixels belongs to the edge portion, according to the determined marker corresponding to each of the pixels.

The first correction processing sub-device 14022 is configured to, if it is determined that the position of the pixel belongs to the edge portion, perform the edge correction processing and the demura correction processing on the grayscale of the pixel in the image to be displayed, according to the pre-created correction data table containing a pixel position, a marker and correction data.

The second correction processing sub-device 14023 is configured to, if it is determined that the position of the pixel does not belong to the edge portion, perform the demura correction processing on the grayscale of the pixel in the image to be displayed, according to the pre-created correction data table containing a pixel position, a marker and correction data.

In one or more embodiment, the determining 14021 is configured to determine that the pixel position of a pixel belongs to the edge portion if it is determined that the marker corresponding to the pixel is a first marker, and determine that the position of the pixel does not belong to the edge portion if it is determined that the marker corresponding to the pixel is a second marker.

In one or more embodiment, the first correction processing sub-device 14022 is configured to read the correction data corresponding to the pixel from the correction data table, to invoke a pre-stored first algorithm for performing both of the edge correction processing and demura correction processing, and to perform the edge correction processing and demura correction processing on the grayscale of the pixel in the image to be displayed, according to the first algorithm and the correction data.

In the above described image processing apparatus according to an embodiment of the present disclosure, the second correction processing sub-device 14023 is configured to read the correction data corresponding to the pixel from the correction data table, to invoke a pre-stored second algorithm for performing the demura correction processing, and to perform the demura correction processing on the grayscale of the pixel in the image to be displayed, according to the second algorithm and the correction data.

In a specific implementation, to create the correction data table, the above described image processing apparatus according to an embodiment of the present disclosure, as shown in FIG. 15, may further include a correction data table creating device 1404.

The correction data table creating device 1404 is configured to pre-create the correction data table containing a pixel position, a marker and correction data.

In one or more embodiment, the correction data table creating device 1404 may include:

a first determining device 14041 configured to determine the edge portion in the display region, and a marker for indicating whether the position of a pixel belongs to the edge portion, according to the position of each of pixels within active area, an edge correction policy in a preset edge correction rule; where the edge portion includes at least the position at which a jagged edge is located when the display panel is irregular;

a second determining device 14042 configured to determine actual brightness information corresponding to each of the pixels within the active area at multiple groups of grayscales;

a third determining device 14043 configured to determine the demura correction data corresponding to each of the pixels, according to the determined actual brightness information corresponding to each of the pixels at multiple groups of grayscales;

a fourth determining device 14044 is configured to determine the edge correction data corresponding to each of the pixels which belong to the edge portion, according to the pixel position of each of the pixels in the active area and the edge correction algorithm in the edge correction rule;

a fifth determining device 14045 is configured to, in accordance with a preset rule, integrate the edge correction data and demura correction data corresponding to each of the pixels which belong to the edge portion to determine the correction data corresponding to each of the pixels which belong to the edge portion;

a sixth determining device 14046 is configured to determine the demura correction data corresponding to each of the pixels not belonging to the edge portion as the correction data corresponding to each of the pixels not belonging to the edge portion; and a creating device 14047 is configured to create a correction data table containing a pixel position, a marker and correction data, according to the determined marker, the correction data corresponding to each of the pixels and the position of each of the pixels in the display panel.

In the above described image processing apparatus according to an embodiment of the present disclosure, the position at which each of the pixels is located in the correction data table may be mapped one by one into the position at which each of the pixels is located in the active area, and a correction data group containing a marker and correction data corresponding to a pixel is stored in the position at which the pixel is located in the correction data table.

Further, in the above described image processing apparatus according to an embodiment of the present disclosure, the correction data group includes n bits; where m bits represent a marker, n−m bits represent correction data, m is 1 or 2, and n is 8 or 10.

In the above described image processing apparatus according to an embodiment of the present disclosure, the edge correction rule at least specifies that as the pixel is closer to the edge of the display panel, the value of the edge correction data for the pixel becomes smaller.

In the above described image processing apparatus according to an embodiment of the present disclosure, the determining device 14042 is configured to light up the display screen respectively at multiple groups of grayscales, to acquire by an optical acquisition device actual brightness of each of the pixels at multiple groups of grayscales and to determine the actual brightness information of each of the pixels at multiple groups of grayscales, according to the actual brightness of each of the pixels acquired by the optical acquisition device at multiple groups of grayscales.

The third determining device 14043 is configured to calculate a brightness average value of each of the pixels at the multiple groups of grayscales, according to the determined actual brightness information corresponding to each of the pixels at the multiple groups of grayscales, to determine the brightness average value as a target brightness, and to determine the demura correction data corresponding to each of the pixels, according to the determined actual brightness information corresponding to each of the pixels at the multiple groups of grayscales and the determined target brightness at the multiple groups of grayscales.

In a specific implementation, the above described image processing apparatus according to an embodiment of the present disclosure, as shown in FIG. 15, may further include a burning device 1405.

The burning device 1405 is configured, after the correction data table containing a pixel position, a marker and correction data is created, to burn the correction data table into a memory.

In a specific implementation, the correction data table creating device 1404 and the burning device 1405 both may be part of the flash memory. In one embodiment, both may be part of other nonvolatile memory. Furthermore, the correction data table creating device 1404 and the burning device 1405 both may be external devices, which are typically positioned external to the displaying device; while the receiving device 1401 and the correction processing device 1402 both may be part of the driving chip, such configuration may allow the internal storage occupied in the driving chip to be reduced, thus increasing the operating speed of the driving chip. In addition, the displaying device 1403 may be a display panel for displaying an image which is correction processed. Therefore, the receiving device 1401, the correction processing device 1402 and the displaying device 1403 are internal devices, which are typically positioned internal to the displaying device.

Figure 16:
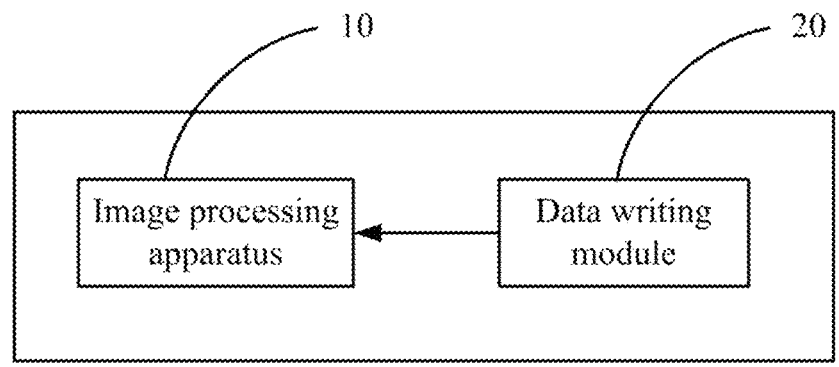
FIG. 16 shows a schematic structural diagram of an image processing system according to an embodiment of the present disclosure.

Based on the same invention idea, an embodiment of the present disclosure provides an image processing system, as shown in FIG. 16, which may include the foregoing image processing apparatus 10 according to the embodiment of the present disclosure. Since the principle of the image processing system is similar to that of the foregoing image processing apparatus, the image processing system according to an embodiment of the disclosure may be implemented with respect to the foregoing image processing apparatus, and no repeated description thereof is given.

In a specific implementation, in order to allow the display panel to receive the data of an image, the above described image processing system according to an embodiment of the present disclosure, as shown in FIG. 16, may further include a data writing device 20. The data writing device 20 is configured to input the data of an image to be displayed to the image processing apparatus 10 so that the data of the image to be displayed can be correction processed by the image processing apparatus 10, and then output and displayed.

Figure 17:
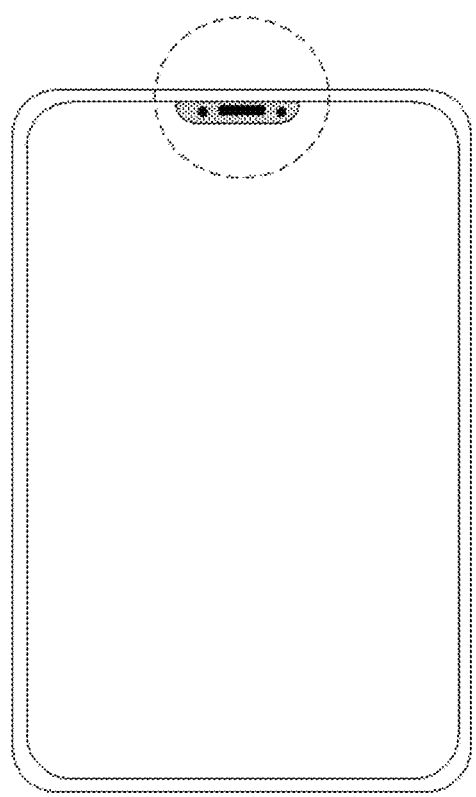
FIG. 17 shows a schematic structural diagram of a display device according to an embodiment of the present disclosure.

Based on the same invention idea, an embodiment of the present disclosure provides a display device, which may include the receiving device, the correction processing device and the displaying device in the foregoing image processing apparatus according to the embodiment of the present disclosure. The display device may be a mobile phone (as shown in FIG. 17), a tablet, a TV, a monitor, a laptop computer, a digital photo frame, a navigator or any of the products or parts which have displaying function. An implementation of the display device may follow the embodiments of the forgoing image processing system, and no repeated description thereof is given.

In a specific implementation, in the full-screen mobile phone shown in FIG. 17, in order to assemble an earpiece, a front-facing camera and various recognition units (for example, a face and iris recognition units, etc.), the top portion is typically configured with a hollow structure (as shown in the dash line circle), so that the edge portion is not standard round corners. The foregoing display device with the image processing system according to the embodiments of the disclosure is not limited by shape during edge correction processing, instead the edge correction processing can be performed for any shape of the edge, and thus the phenomenon of contour jaggies of the full-screen shown in FIG. 17 can be effectively removed, therefore improving the displaying effect and viewing experience of the display device.

Figure 18:
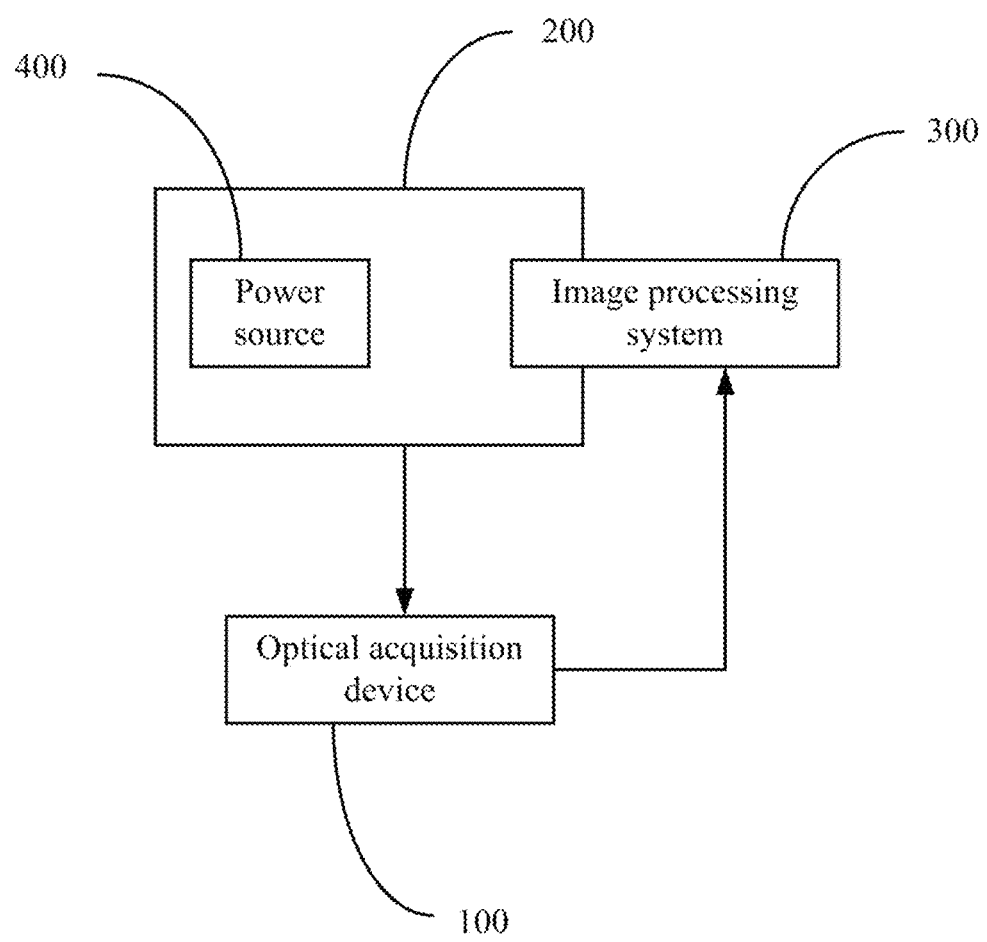
FIG. 18 shows a schematic structural diagram illustrating the relationship between the display device, the image processing system and an optical acquisition device according to an embodiment of the present disclosure.

In order to implement the above described display device according to an embodiment of the present disclosure, as shown in FIG. 18, an optical acquisition device 100 may acquire the brightness information of each of the pixels in the display device 200, and output the acquired brightness information to the image processing system 300, so as to process the image to be displayed. In one embodiment, the optical acquisition device 100 can be any of various apparatuses which is capable of acquiring the brightness information of each of the pixels in the display device, and no limitation is made thereto.

In one or more embodiment, to allow the display device 200 to be lighted up, so that the brightness information of each of the pixels in the display device 200 is acquired by the optical acquisition device 100, the above described display device according to an embodiment of the present disclosure may further include a power source 400 for lighting up the display device 200 so that the brightness information is acquired by the optical acquisition device 100, as shown in FIG. 18. In one embodiment, the power source 400 may be a battery inside the display device 200 (as shown in FIG. 18), or may be other power supply structure, and no limitation is made thereto.

Embodiments of the present disclosure may be provided as a method, a system, or a computer program product. Accordingly, the present disclosure may take the form of an entirely hardware embodiment, an entirely software embodiment or an embodiment combining software and hardware aspects. Further, the present application may take the form of one or more computer program product embodied in one or more computer readable medium(s) (including but not limited to, disk storage, optical memory, etc.) having computer usable program code embodied thereon.

The application is described with reference to the flowchart and/or block diagrams of the method, device (system) and computer program product according to the embodiments of the present disclosure. It should be understood that each of the processes and/or blocks in the flowchart and/or block diagram and a combination of the processes and/or blocks in the flowchart and/or block diagram may be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implement the function specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions specified in the flowchart and/or block diagram block or blocks.

In the image processing method, the image processing apparatus, the image processing system and the display device according to embodiments of the present disclosure, after a signal for the image to be displayed is received, correction processing can be performed on the grayscale of each of the pixels in the image to be displayed and is not limited to the shape of the display panel, which is applicable to the display panel with any shaped screen (including those display panels of at least one of the above described special display screens) and has relatively high flexibility. Furthermore, because the pre-created correction data table has the pixel position(s), the marker(s) and the correction data contained herein, the correction data corresponding to a pixel are correction data integrated from displaying correction data and edge correction data if the position of the pixel belongs to the preset edge portion and the correction data corresponding to the pixel are the displaying correction data if the position of the pixel does not belong to the preset edge portion. The displaying correction data, and the correction data integrated from the displaying correction data and the edge correction data are both contained in the correction data table, so that the logic resource occupied in the image processing system can be effectively reduced; furthermore, the correction is performed for displaying effect meanwhile the correction is performed for the edge effect of the pixels positioned in the edge portion, thus improving the efficiency and quality of the correction processing.

The invention claimed is:

1. An image processing method, comprising:
receiving a signal for an image to be displayed, wherein the image includes pixels;
performing correction processing on grayscale of each of the pixels in the image to be displayed, according to a pixel position of each of the pixels within an active area of a display panel and a pre-created correction data table containing a pixel position, a marker and correction data, wherein when the pixel position of a pixel belongs to a edge portion, the correction data corresponding to the pixel are correction data integrated from displaying correction data and edge correction data; when the position of the pixel does not belong to the edge portion, the correction data corresponding to the pixel is the displaying correction data; and
displaying the image according to the processed grayscale of each of the pixels.

2. The method according to claim 1, wherein the displaying correction data is demura correction data;
the operation of performing correction processing on the grayscale of each of the pixels in the image to be displayed according to a pixel position of each of the pixels within an active area of the display panel and the pre-created correction data table containing a pixel position, a marker and correction data, comprises:
determining a marker corresponding to each of the pixels, according to the pre-created correction data table containing a pixel position, a marker and correction data;
determining whether the pixel position of each of the pixels belongs to the edge portion, according to the determined marker corresponding to each of the pixels;
when it is determined that the position of the pixel belongs to the edge portion, performing an edge correction processing and a demura correction processing on the grayscale of the pixel in the image to be displayed, according to the pre-created correction data table containing a pixel position, a marker and correction data; and
when it is determined that the position of the pixel does not belong to the edge portion, performing the demura correction processing on the grayscale of the pixel in the image to be displayed, according to the pre-created correction data table containing a pixel position, a marker and correction data.

3. The method according to claim 2, the operation of determining whether the pixel position of each of the pixels belongs to the edge portion, according to the determined marker corresponding to each of the pixels comprises:
determining that the pixel position of a pixel belongs to the edge portion when it is determined that the marker corresponding to the pixel is a first marker; and
determining that the pixel position of a pixel does not belong to the edge portion when it is determined that the marker corresponding to the pixel is a second marker.

4. The method according to claim 2, wherein the operation of performing the edge correction processing and demura correction processing on the grayscale of the pixel in the image to be displayed, according to the pre-created correction data table containing a pixel position, a marker and correction data comprises:
reading the correction data corresponding to the pixel from the correction data table;
invoking a pre-stored first algorithm for performing both of the edge correction processing and demura correction processing, and
performing the edge correction processing and the demura correction processing on the grayscale of the pixel in the image to be displayed, according to the first algorithm and the correction data.

5. The method according to claim 2, wherein the operation of performing demura correction processing on the grayscale of the pixel in the image to be displayed, according to the pre-created correction data table containing a pixel position, a marker and correction data comprises:
reading the correction data corresponding to the pixel from the correction data table;
invoking a pre-stored second algorithm for performing the demura correction processing; and
performing the demura correction processing on the grayscale of the pixel in the image to be displayed, according to the second algorithm and the correction data.

6. The method according to claim 2, before receiving the signal for the image to be displayed, a correction data table containing a pixel position, a marker and correction data is determined as follows:
determining the edge portion in the display region, and a marker for indicating whether the pixel position of a pixel belongs to the edge portion, according to the pixel position of each of the pixels within an active area, and an edge correction policy in a preset edge correction rule; wherein the edge portion comprises at least the position at which a jagged edge is located if the display panel is irregular;
determining actual brightness information corresponding to each of the pixels within the active area at multiple groups of grayscales;
determining the demura correction data corresponding to each of the pixels, according to the determined actual brightness information corresponding to each of the pixels at multiple groups of grayscales;
determining the edge correction data corresponding to each of the pixels which belong to the edge portion, according to the pixel position of each of the pixels in the active area and the edge correction algorithm in the edge correction rule;
in accordance with the preset rule, integrating the edge correction data and demura correction data corresponding to each of the pixels which belong to the edge portion to determine the correction data corresponding to each of the pixels which belong to the edge portion;
determining the demura correction data corresponding to each of the pixels not belonging to the edge portion as the correction data corresponding to each of the pixels not belonging to the edge portion; and
creating a correction data table containing a pixel position, a marker and correction data, according to the determined marker and correction data corresponding to each of the pixels and the pixel position of each of the pixels in the display panel.

7. The method according to claim 6, wherein a position at which each of the pixels is located in the correction data table is mapped one by one into a position at which each of the pixels is located in the active area; and a correction data group comprising a marker and correction data corresponding to a pixel is stored in the position at which the pixel is located in the correction data table.

8. The method according to claim 7, wherein the correction data group includes n bits; wherein m bits represent a marker, n-m bits represent correction data, m is 1 or 2, and n is 8 or 10.

9. The method according to claim 7, wherein after creating the correction data table containing a pixel position, a marker and correction data, burning the correction data into a memory.

10. The method according to claim 6, wherein the edge correction rule at least specifies that as the pixel is closer to the edge of the display panel, the value of the edge correction data for the pixel becomes smaller.

11. The method according to claim 6, wherein the operation of determining actual brightness information corresponding to each of the pixels within the active area at multiple groups of grayscales comprises:
   lighting up the display panel respectively at multiple groups of grayscales;
   acquiring, by an optical acquisition device, actual brightness of each of the pixels at the multiple groups of grayscales;
   determining actual brightness information of each of the pixels at the multiple groups of grayscales, according to the actual brightness of each of the pixels acquired by the optical acquisition device at the multiple groups of grayscales;
   the operation of determining the demura correction data corresponding to each of the pixels, according to the determined actual brightness information corresponding to each of the pixels at multiple groups of grayscales comprises:
   calculating a brightness average value of each of the pixels at the multiple groups of grayscales, according to the determined actual brightness information corresponding to each of the pixels at the multiple groups of grayscales, and determining the brightness average value as a target brightness; and
   determine the demura correction data corresponding to each of the pixels, according to the determined actual brightness information corresponding to each of the pixels at the multiple groups of grayscales and the determined target brightness at the multiple groups of grayscales.

12. An image processing apparatus, comprising a receiver, a display panel, a memory and a processor, wherein:
   the receiver is configured to receive a signal for an image to be displayed, wherein the image includes pixels;
   the memory is configured to store a computer readable program and a pre-created correction data table containing a pixel position, a marker and correction data;
   the processor executing the computer readable program is configured to perform correction processing on grayscale of each of the pixels in the image to be displayed according to a pixel position of each of the pixels within an active area of the display panel and the pre-created correction data table; wherein when the pixel position of a pixel belongs to a edge portion, the correction data corresponding to the pixel are correction data integrated from displaying correction data and edge correction data; when the position of the pixel does not belong to the edge portion, the correction data corresponding to the pixel are the displaying correction data; and
   the display panel is configured to display the image according to the processed grayscale of each of the pixels.

13. The image processing apparatus according to claim 12, wherein the displaying correction data are demura correction data; and
   the processor is configured to perform the correction processing on grayscale of each of the pixels in the image to be displayed by:
   determining a marker corresponding to each of the pixels, according to the pre-created correction data table containing a pixel position, a marker and correction data, and determining whether the pixel position of each of the pixels belongs to the edge portion, according to the determined marker corresponding to each of the pixels;
   when it is determined that the position of the pixel belongs to the edge portion, performing an edge correction processing and a demura correction processing on the grayscale of the pixel in the image to be displayed, according to the pre-created correction data table containing a pixel position, a marker and correction data; and
   when it is determined that the position of the pixel does not belong to the edge portion, performing the demura correction processing on the grayscale of the pixel in the image to be displayed, according to the pre-created correction data table containing a pixel position, a marker and correction data.

14. The image processing apparatus according to claim 13, the processer is configured to determine whether the pixel position of each of the pixels belongs to the edge portion by:
   determining that the pixel position of a pixel belongs to the edge portion when it is determined that the marker corresponding to the pixel is a first marker; and
   determining that the pixel position of a pixel does not belong to the edge portion when it is determined that the marker corresponding to the pixel is a second marker.

15. The image processing apparatus according to claim 13, wherein when it is determined that the position of the pixel belongs to the edge portion, the processor is configured to perform the edge correction processing and the demura correction processing by:
   reading the correction data corresponding to the pixel from the correction data table;
   invoking a pre-stored first algorithm for performing both of the edge correction processing and demura correction processing; and
   performing the edge correction processing and the demura correction processing on the grayscale of the pixel in the image to be displayed, according to the first algorithm and the correction data.

16. The image processing apparatus according to claim 13, wherein when it is determined that the position of the pixel does not belong to the edge portion, the processor is configured to perform the demura correction processing by:
   reading the correction data corresponding to the pixel from the correction data table;
   invoking a pre-stored second algorithm for performing the demura correction processing; and
   performing the demura correction processing on the grayscale of the pixel in the image to be displayed, according to the second algorithm and the correction data.

17. The image processing apparatus according to claim 12, wherein the processor is further configured to pre-create the correction data table containing a pixel position, a marker and correction data.

18. The image processing apparatus according to claim 17, wherein the processor is configured to pre-create the correction data table by:
- determining the edge portion in the display region, and a marker for indicating whether the pixel position of a pixel belongs to the edge portion, according to the pixel position of each of the pixels within an active area, an edge correction policy in a preset edge correction rule; wherein the edge portion comprises at least the position at which a jagged edge is located if the display panel is irregular;
- determining actual brightness information corresponding to each of the pixels within the active area at multiple groups of grayscales;
- determining the demura correction data corresponding to each of the pixels, according to the determined actual brightness information corresponding to each of the pixels at the multiple groups of grayscales;
- determining the edge correction data corresponding to each of the pixels which belong to the edge portion, according to the pixel position of each of the pixels in the active area and the edge correction algorithm in the edge correction rule;
- integrating the edge correction data and demura correction data corresponding to each of the pixels which belong to the edge portion to determine the correction data corresponding to each of the pixels which belong to the edge portion;
- determining the demura correction data corresponding to each of the pixels not belonging to the edge portion as the correction data corresponding to each of the pixels not belonging to the edge portion; and
- creating a correction data table containing a pixel position, a marker and correction data, according to the determined marker and correction data corresponding to each of the pixels and the pixel position of each of the pixels in the display panel.

19. The image processing apparatus according to claim 18, wherein a position at which each of the pixels is located in the correction data table is mapped one by one into a position at which each of the pixels is located in the active area; and a correction data group comprising a marker and correction data corresponding to a pixel is stored in the position at which the pixel is located in the correction data table.

20. The image processing apparatus according to claim 19, wherein the correction data group includes n bits; wherein m bits represent a marker, n-m bits represent correction data, m is 1 or 2, and n is 8 or 10.

21. The image processing apparatus according to claim 18, wherein the edge correction rule at least specifies that as the pixel is closer to the edge of the display panel, the value of the edge correction data for the pixel becomes smaller.

22. The image processing apparatus according to claim 18, further comprising an optical acquisition device, wherein the optical acquisition device is configured to acquire actual brightness of each of the pixels at the multiple groups of grayscales; and the processor is configured to determine actual brightness information corresponding to each of the pixels within the active area at multiple groups of grayscales by:
- lighting up the display screen respectively at multiple groups of grayscales; and
- determining actual brightness information of each of the pixels at the multiple groups of grayscales, according to the actual brightness of each of the pixels acquired by the optical acquisition device at the multiple groups of grayscales;

the processor is configured to determine the demura correction data corresponding to each of the pixels, according to the determined actual brightness information corresponding to each of the pixels at the multiple groups of grayscales by:
- calculating a brightness average value of each of the pixels at the multiple groups of grayscales, according to the determined actual brightness information corresponding to each of the pixels at the multiple groups of grayscales;
- determining the brightness average value as a target brightness; and
- determining the demura correction data corresponding to each of the pixels, according to the determined actual brightness information corresponding to each of the pixels at any of the multiple groups of grayscales and the determined target brightness at the multiple groups of grayscales.

23. The image processing apparatus according to claim 18, wherein the processor is further configured to, after the correction data table containing a pixel position, a marker and correction data is created, burn the correction data into the memory.

24. A display device, comprising an image processing apparatus, wherein the image processing apparatus comprises:
- a receiving device configured to receive a signal for an image to be displayed;
- a correction processing device configured, according to a pixel position of each of pixels within the active area of a display panel and a pre-created correction data table containing a pixel position, a marker and correction data, to perform correction processing on grayscale of each of the pixels in the image to be displayed; wherein when the pixel position of a pixel belongs to a edge portion, the correction data corresponding to the pixel are correction data integrated from displaying correction data and edge correction data; when the position of the pixel does not belong to the edge portion, the correction data corresponding to the pixel are the displaying correction data; and
- a displaying device configured to display the image according to the processed grayscale of each of the pixels.

* * * * *